US012123966B2

(12) United States Patent
Wu et al.

(10) Patent No.: US 12,123,966 B2
(45) Date of Patent: Oct. 22, 2024

(54) AUTOMOTIVE RADAR WITH TIME-FREQUENCY-ANTENNA DOMAIN THRESHOLD INTERFERENCE ISOLATION AND LOCALIZATION FUSION

(71) Applicant: NXP B.V., Eindhoven (NL)

(72) Inventors: Ryan Haoyun Wu, San Jose, CA (US); Feike Guus Jansen, Eindhoven (NL); Michael Andreas Staudenmaier, Munich (DE); Maik Brett, Taufkirchen (DE)

(73) Assignee: NXP B.V., Eindhoven (NL)

( * ) Notice: Subject to any disclaimer, the term of this patent is extended or adjusted under 35 U.S.C. 154(b) by 387 days.

(21) Appl. No.: 17/533,906

(22) Filed: Nov. 23, 2021

(65) Prior Publication Data

US 2023/0160997 A1     May 25, 2023

(51) Int. Cl.
    *G01S 7/02*      (2006.01)
    *G01S 7/40*      (2006.01)
    *G01S 7/4865*    (2020.01)
    *G01S 13/931*    (2020.01)

(52) U.S. Cl.
    CPC ............ *G01S 7/023* (2013.01); *G01S 7/4026* (2013.01); *G01S 7/4865* (2013.01); *G01S 13/931* (2013.01)

(58) Field of Classification Search
    CPC ...... G01S 7/023; G01S 7/4026; G01S 7/4865; G01S 13/931
    See application file for complete search history.

(56) References Cited

U.S. PATENT DOCUMENTS

| 2017/0010344 A1 | 1/2017 | Corbett |
| 2020/0393536 A1* | 12/2020 | Stettiner ............... G01S 13/343 |

FOREIGN PATENT DOCUMENTS

| CN | 113056925 A * | 6/2021 | ......... B65D 85/8052 |
| CN | 113189544 A * | 7/2021 | ............... G01S 5/22 |
| WO | WO-2014179308 A1 * | 11/2014 | ........... G01S 3/8006 |
| WO | WO2019106656 A1 | 6/2019 | |

OTHER PUBLICATIONS

Norouzian, F., "Phenomenology of automotive radar interference", IET Radar, Sonar & Navigation, Original Research Paper, vol. 15, No. 9, May 12, 2021.

(Continued)

*Primary Examiner* — Vladimir Magloire
*Assistant Examiner* — Noah Yi Min Zhu

(57) ABSTRACT

Described are method and systems that implement time frequency domain threshold interference and localization fusion to resolve interference issues in an automotive radar system, that produces spectrograms using Short-Time Fourier Transform (STFT) for all receiving antennas of the automotive radar system. For each STFT frequency a suppression threshold is determined. Interference is isolated for each STFT frequency by removing the interference from samples that are above the suppression threshold by using a filter. Direction of Arrival (DoA) is estimated for each interference spectrogram cell using measurements from all the receiving antennas. Interference samples are clustered using the DoA into epochs of chirps.

20 Claims, 27 Drawing Sheets

(56) References Cited

OTHER PUBLICATIONS

Wang, J., "CFAR-Based Interference Mitigation for FMCW Automotive Radar Systems", arxiv.org, Cornell University Library, Jan. 4, 2021.
J. Bechter and C. Waldschmidt, "Automotive radar interference mitigation by reconstruction and cancellation of interference component," 2015 IEEE MTT-S International Conference on Microwaves for Intelligent Mobility (ICMIM), Heidelberg, 2015.
J. Bechter, F. Roos, M. Rahman and C. Waldschmidt, "Automotive Radar Interference Mitigation using a Sparse Sampling Approach," 2017 European Radar Conference (EURAD), Nuremberg, 2017, pp. 90-93.
F. Uysal and S. Sanka "Mitigation of automotive radar interference," 2018 IEEE Radar Conference (RadarConf18), Oklahoma City, OK, 2018, pp. 0405-0410.

\* cited by examiner

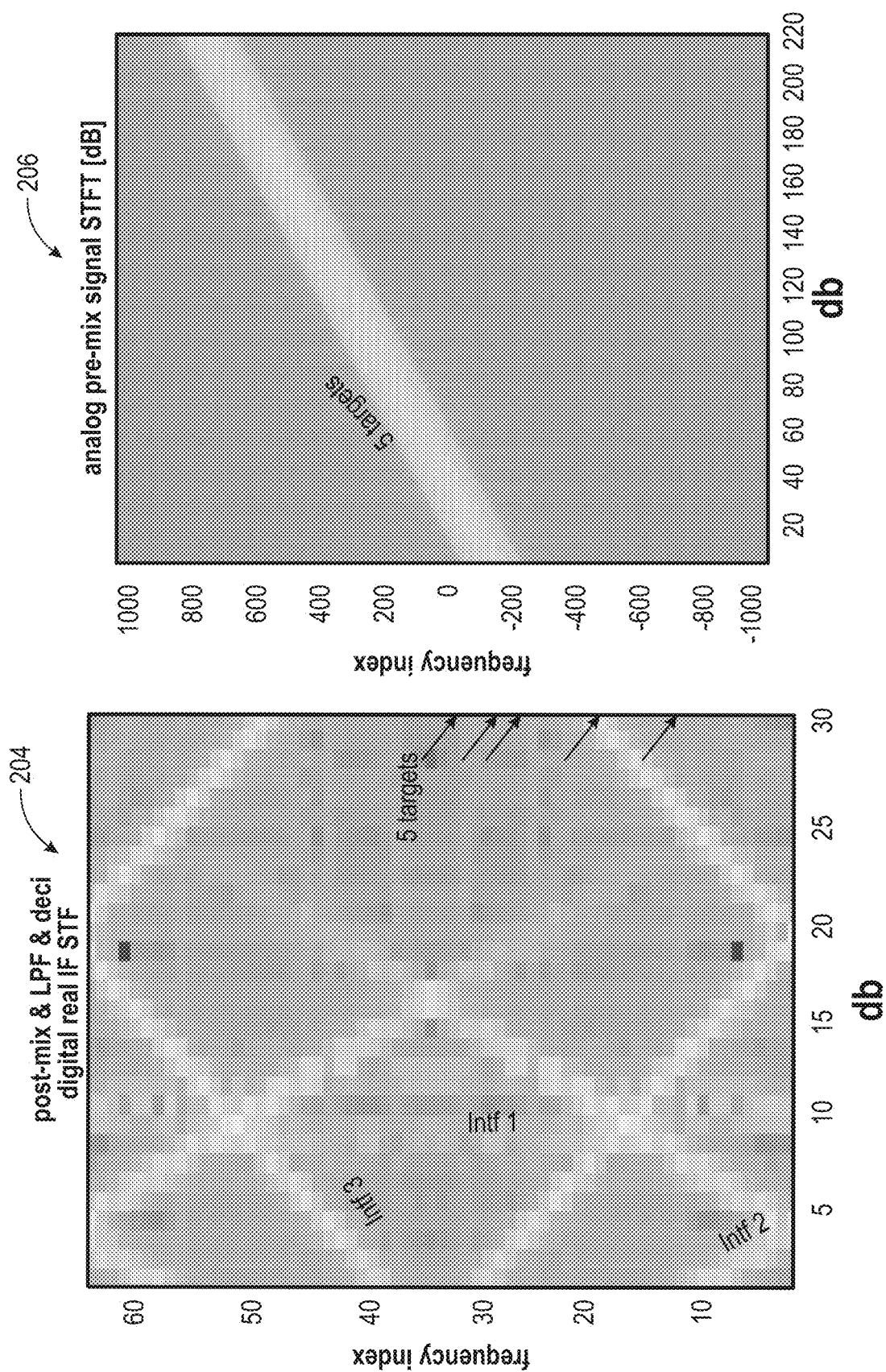
Figure 2(Cont...)

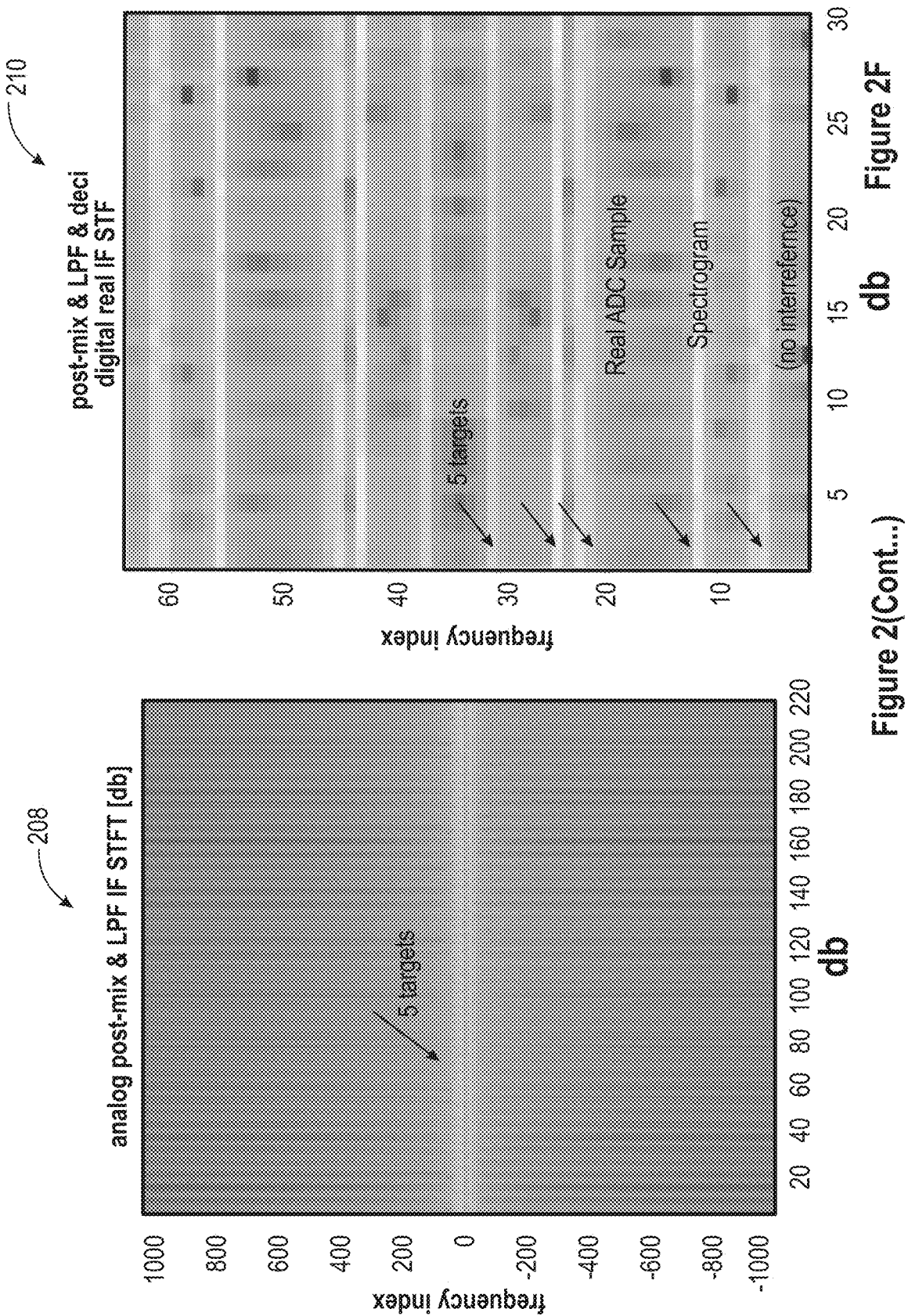
Figure 2(Cont...) Figure 2F

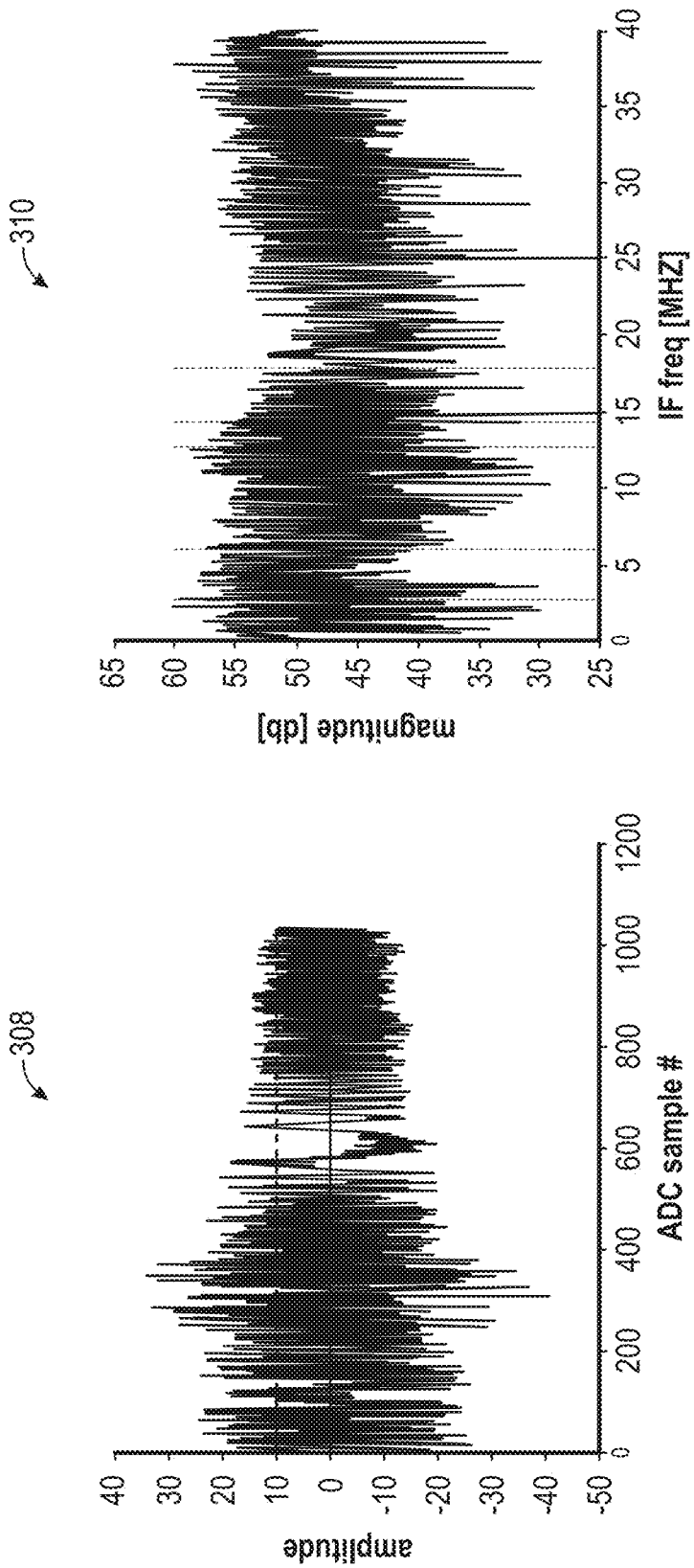
Figure 3(Cont...)

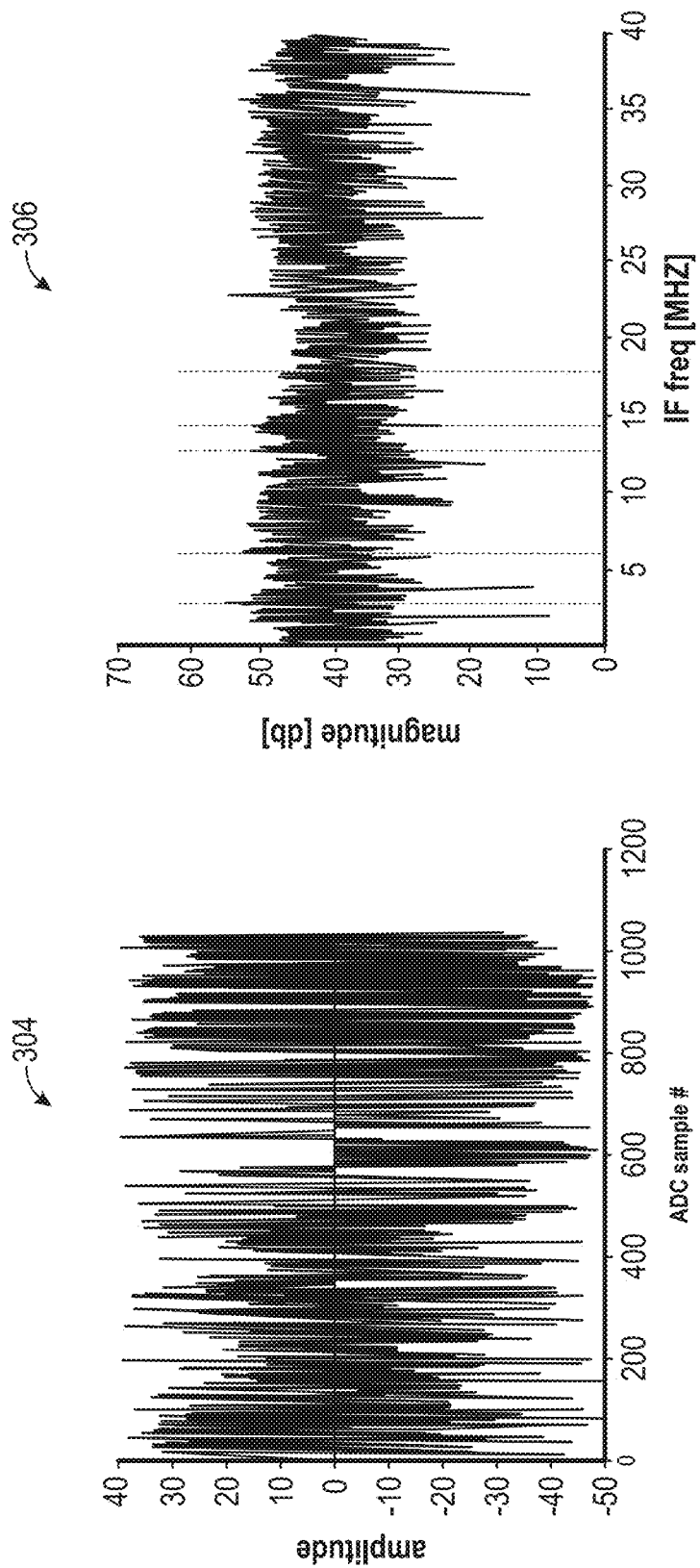
Figure 3(Cont...)

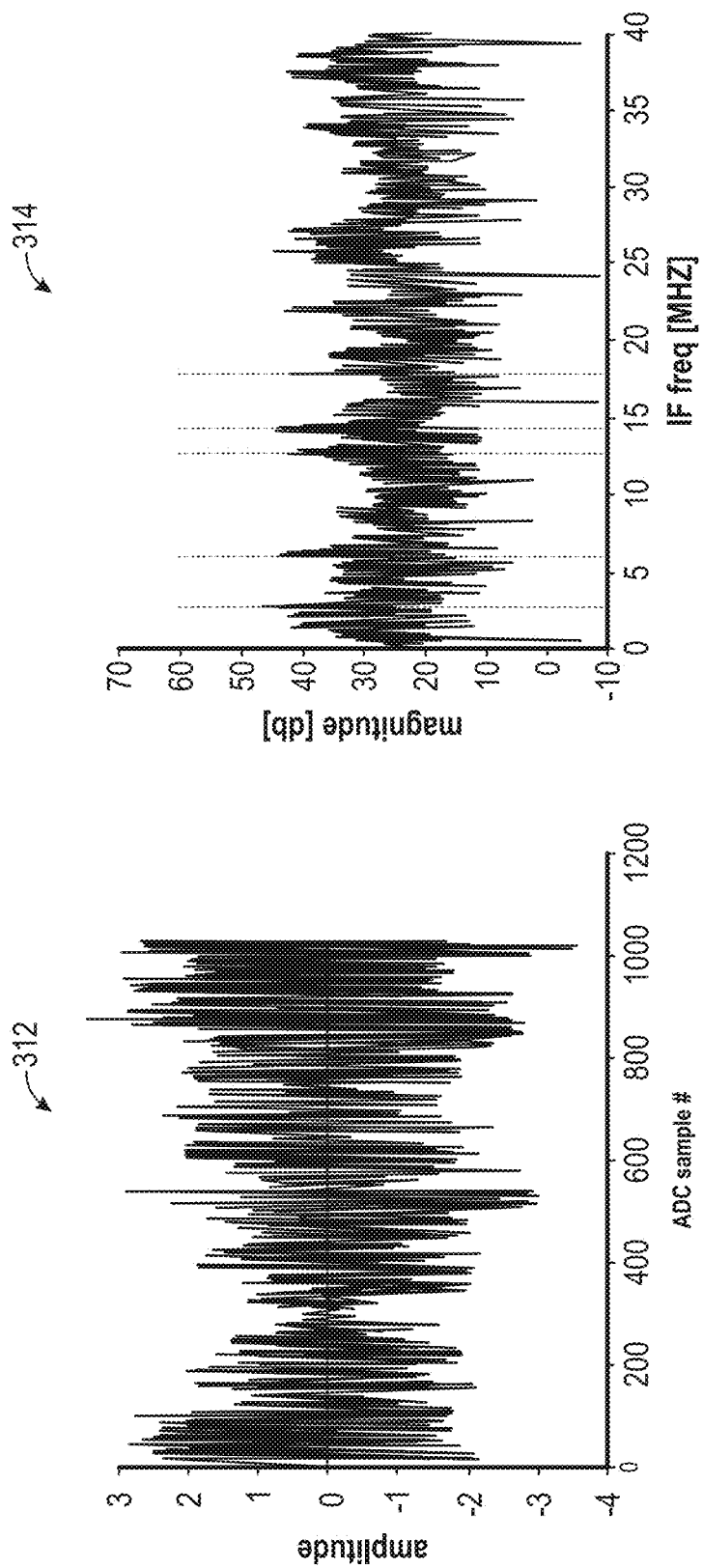
Figure 3(Cont...)

AUTOMOTIVE RADAR WITH TIME-FREQUENCY-ANTENNA DOMAIN THRESHOLD INTERFERENCE ISOLATION AND LOCALIZATION FUSION

BACKGROUND OF THE INVENTION

Field

This disclosure relates generally to radar systems and associated methods of operation, and more specifically, to automotive radar systems that implement time frequency domain threshold interference and localization fusion to resolve interference issues.

Description of the Related Art

Radar systems are used to detect the range, velocity, and angle of nearby targets. With advances in technology, radar systems can now be applied in many different applications, such as automotive radar safety systems used in advanced driver assistance systems (ADAS). ADAS has become a standard part of automotive safety equipment and is used in many automobiles.

Linear Frequency Modulation (LFM) is typically used in ADAS radars. With so many automobiles using ADAS, there can be a congested spectrum environment where LFM radars can severely interfere with one another. The interference problem can only increase with more and more use of ADAS radars. The interference problem can potentially lead to degraded performance and failure of automotive radar systems.

Radar systems may employ the use of time frequency thresholding and zeroing processes. The zeroing of spectrogram samples may remove most received interference signals; however, such zeroing also removes target signals. The end result zeroed samples are analogous to missing time-frequency domain samples. As such, signal to noise ratio is reduced and can result in ambiguous sidelobes in the range and Doppler spectrums. Furthermore, zeroing patterns can be quasi random, resulting in a raised sidelobe floor in the range and Doppler spectrum. Therefore, there is a need for better thresholding and more precise removal of interference signals.

Radar systems may also discard removed interference spectrogram samples. Such removed interference spectrogram samples can include useful information as to interference targets. Better use of the removed interference spectrogram samples can achieve better overall system performance.

SUMMARY OF THE INVENTION

Described are a computer-implementable method, automotive radar system, and non-transitory, computer-readable storage medium for implementing time frequency domain threshold interference and localization fusion to resolve interference issues comprising: producing spectrograms using Short-Time Fourier Transform (STFT) for all receiving antennas of the automotive radar system; determining for each STFT frequency a suppression threshold; isolating interference for each STFT frequency by removing the interference from samples that are above the suppression threshold by using a filter; estimating the Direction of Arrival (DoA) for each interference spectrogram cell using measurements from all the receiving antennas; and clustering interference samples using the DoA into epochs of chirps.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Embodiments described herein, provide for a linear frequency modulated/modulation (LFM) radar system where raw ADC samples are processed to remove interference components before subsequent range, Doppler, and angle processing are carried out. The removed interference samples are further processed to retrieve useful interfering target information and optionally to reconstruct interference signals for cancellation.

Implementations provide for performing the following: 1) producing spectrograms using Short-Time Fourier Transform (STFT) for all receiving antennas; 2) for each STFT frequency, determining a suppression threshold based on statistical analysis on samples from all receiving antennas; 3) for each STFT frequency, isolating interference by removing spectrogram samples that are above the suppression threshold and replace them with zeros and placing the removed spectrogram samples in different interference spectrograms; 4) computing inverse STFT of the interference-zeroed spectrogram and obtaining the interference-suppressed ADC samples for subsequent processes; 5) estimating the Direction of Arrival (DoA) of each Interference Spectrogram cell using measurements from all receiving antennas; 6) clustering interference samples using DoA into epochs (i.e., summarized data chunks) of chirps and estimating chirp parameters; 7) reporting interferer DoA and chirp parameters (as identification of the interferers) to an interference localization fusion processor; and 8) in the interference localization fusion processor, correlating interferer epochs from all sensors and estimating their locations.

Figure 1A:
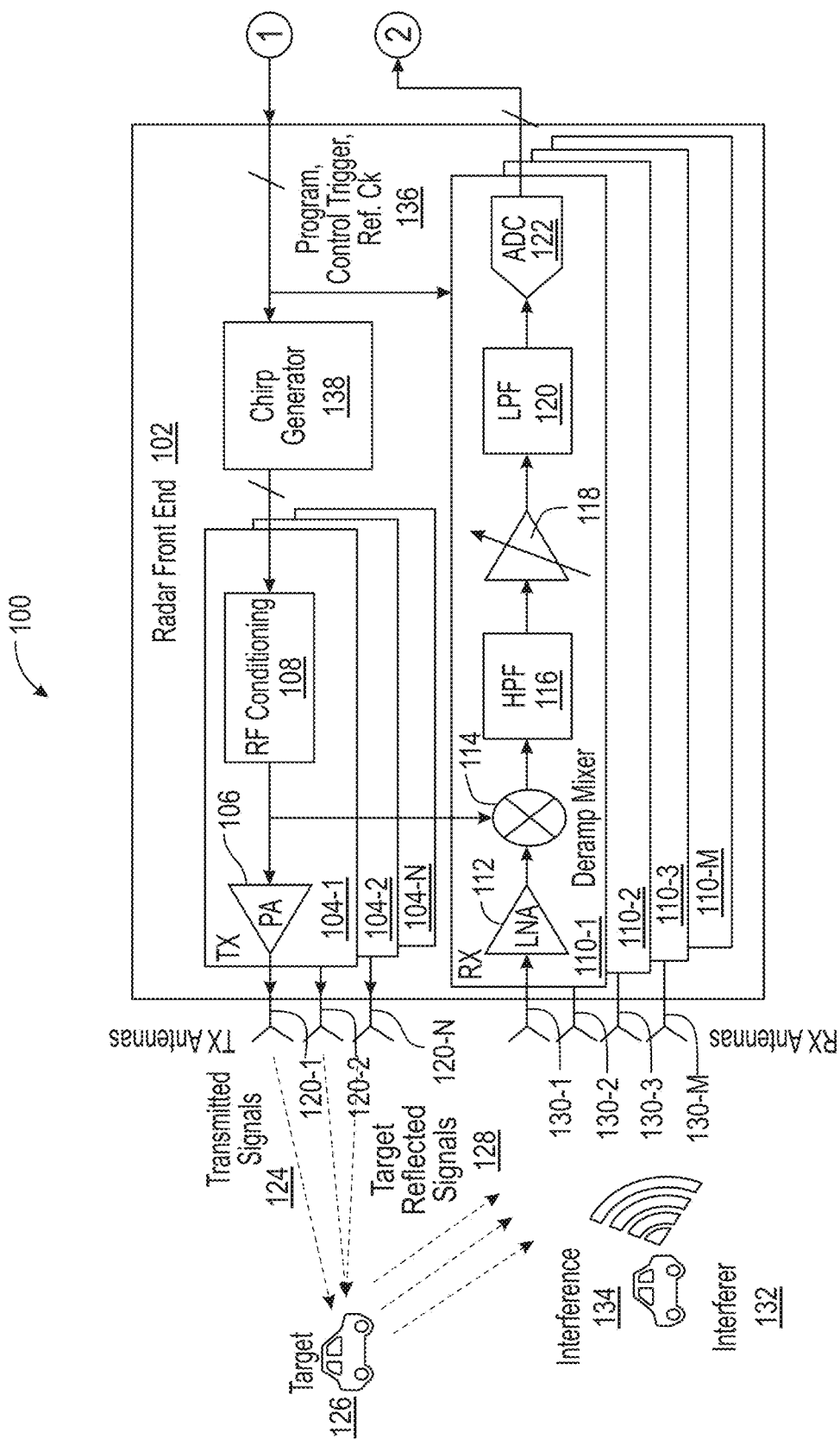
FIG. 1A is a general illustration of a radar system as implemented in the system and method of the present invention.
Figure 1B:
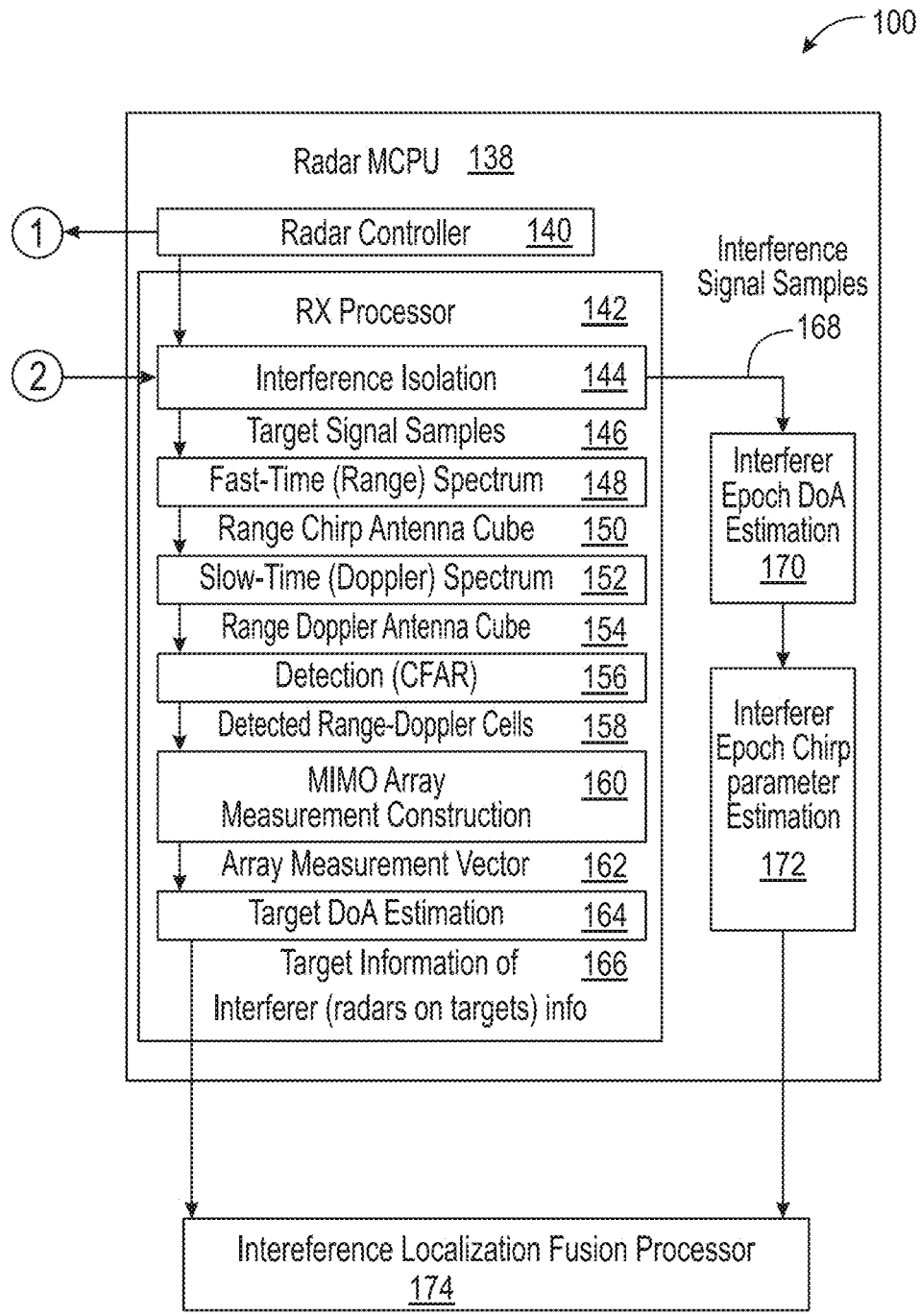
FIG. 1B is a general illustration of a radar system as implemented in the system and method of the present invention.

FIGS. 1A and 1B show an example radar system 100 as implemented in the system and methods described herein. Implementations provide for radar system 100 to be part of a larger system, such as an advanced driver assistance system (ADAS).

FIG. 1A shows a radar front end 102 of the radar system. The radar front end 102 can include multiple transceivers 104-1 to 104-N. Each transceiver 104 can be implemented with a power amplifier (PA) 106, and an RF conditioning component 108. The radar front end 102 can further include multiple receivers 110-1 to 110-M. Each receiver can be implemented with a low noise amplifier (LNA) 112, a deramp mixer 114 (used for cleaning up electronic signals), high pass filter (HPF) 116, a power amplifier 118, a low pass filter 120, and an analog to digital converter (ADC) 122.

The transceivers 104 are configured with transmit antennas 120. Each transceiver 104 is configured with its own transmit antenna 120 (i.e., transmitter 104-1 with transmit antenna 120-1, transmitter 104-2 with transmit antenna 120-2, transmitter 104-3 with transmit antenna 120-3, transmitter 104-N with transmit antenna 120-N). Transmitters 104 send transmitted signals 124 to a target 126. The transmitted signals are reflected from the target, and target reflected signals 128 are sent back to the radar system 100. The target reflected signals 128 are received by receiver antennas 130-1 to 130-M, where each receiver 110 is configured with its own receiver antenna 130 (i.e., receiver 110-1 with receiver antenna 130-1, receiver 110-2 with receiver antenna 130-2, receiver 110-3 with receiver antenna 130-3, receiver 110-M with receiver antenna 130-M).

Along with receiving transmitted signals 122, the receivers 110 receive other unwanted signals. For example, an interferer 132 can send/transmit interference 134 which are received by receivers 110.

Implementations further provide for the radar front end 102 to receive program, control trigger, and reference clock signals 136. Such signals are received and processed at a chirp generator and the receivers 110.

Referring now to FIG. 1B, the radar system 100 further can be implemented with a radar master controller processing unit (MCPU) 138. The radar MCPU 138 can include a radar controller 140 and a receiver processor 142. The radar controller 140 provides the program, control trigger, and reference clock signals 136 described above.

The receiver processor 140 receives the processed signals from the receivers 110, and particularly processed signals from the ADCs 122 of the receivers 110. Implementations provide for the receiver processor 140 to include an interference isolation component 144, which provides target signal samples 146.

A fast time (range) spectrum component 148 receives and processes the target signal samples 146 and provides range chirp data 150 for the antennas 130. The range chirp data 150 is cubed with X axis and Y axis made up of fast time data and the Z axis represent data for each of the antennas 130. The range chirp data 150 is received and processed by a slow time (Doppler) spectrum component 152. The slow time spectrum component 152 provides range Doppler data 154 that is cubed with X axis and Y axis made up of slow time data and the Z axis represent data for each of the antennas 130.

The range Doppler data 154 is received and processed by a constant false alarm rate (CFAR) detection component 154. The detection component 154 provides detected range and Doppler cell data 158. A multi-input multi-output (MIMO) array measurement construction component 160 receives and processes the detected range and Doppler cell data 158. The MIMO array measurement construction component 160 provides an array measurement vector 162.

The array measurement vector is received and processed by a target Direction of Arrival (DoA) estimation component 164. The target DoA estimation component 164 provides target information of the interferer information 166, which is information of radars on targets.

Implementations provide for the interference isolation component 144 to provide interference signal samples 168 to an interferer epoch DoA estimation component 170 and to an interferer epoch chirp parameter estimation component 172.

An interference localization fusion processor 174 receives and processes target information of the interferer information 166 and the estimates from interferer epoch DoA estimation component 170 and interferer epoch chirp parameter estimation component 172. A data interface can be provided from the interference localization fusion processor 174 to other ADAS/Autonomous Driving perception, tracking, fusion, vehicle control, and vehicle sensor control systems.

Figure 2:
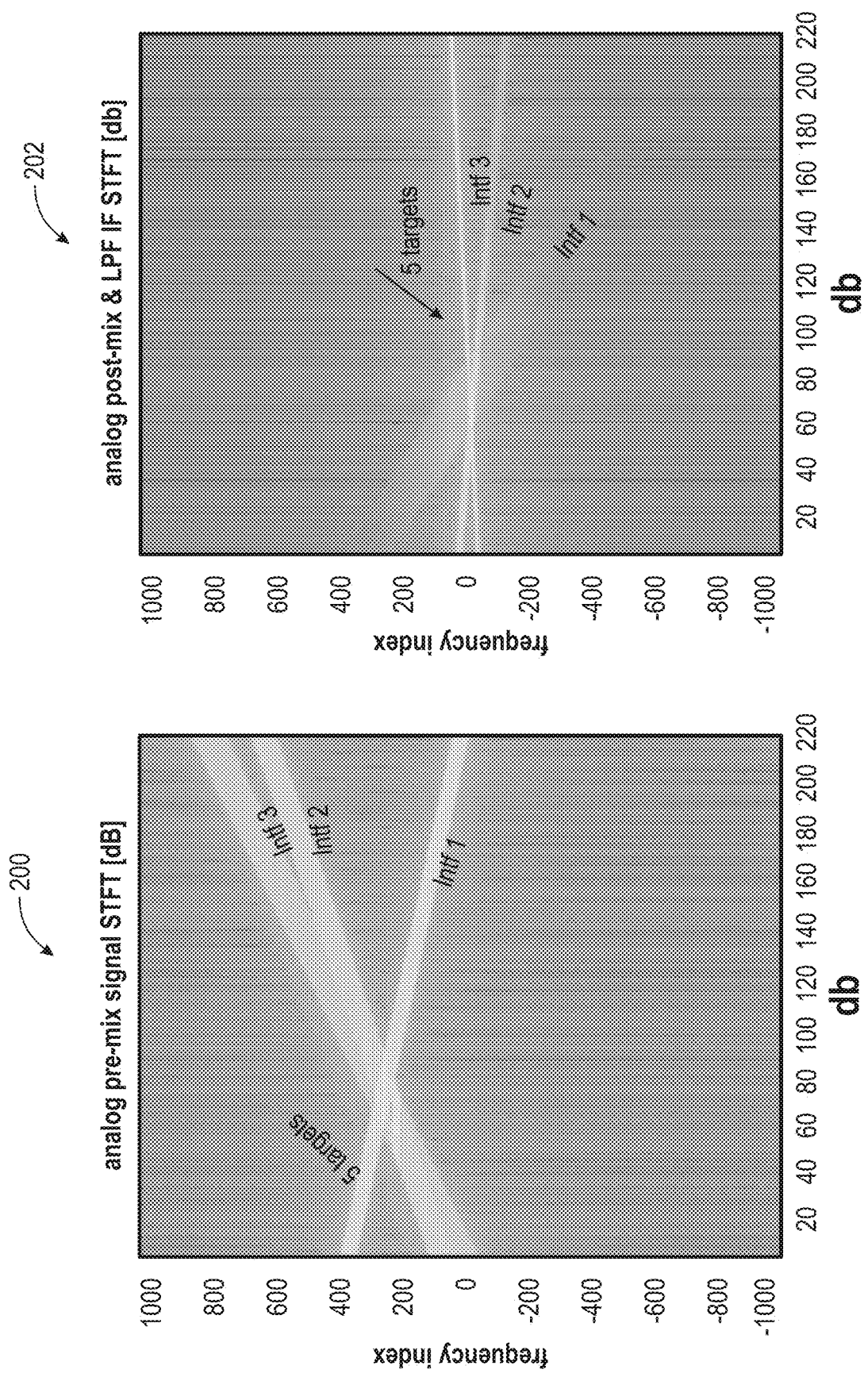
FIG. 2 illustrates signal spectrograms of received signals in severe interference scenarios and in no interference scenarios.

FIG. 2 shows example signal spectrograms of received signals in severe interference scenarios and in no interference scenarios. Graph 200 shows an analog pre-mix signal in Short-Time Fourier Transform (STFT) measured in decibels compared to a frequency index. In this example, there are five targets and three interferers. Graph 202 shows an analog post-mix and lowpass filter (LPF) intermediate frequency (IF) signal in STFT measured in decibels compared to a frequency index. There are five targets and three interferers. Graph 204 shows an analog post-mix and LPF and decimal digital real intermediate frequency (IF) in STFT measured in decibels compared to a frequency index. There are five targets and three interferers. Graphs 200, 202, and 204 depict received target signals under severe interference.

Graph 206 shows an analog pre-mix signal in STFT measured in decibels compared to a frequency index. There are five targets and no interferers. Graphs 200 and 206 depict the pre-deramp mixer signal spectrogram (spectrum over time). Graph 202 shows an analog post-mix and lowpass filter (LPF) intermediate frequency (IF) signal in STFT measured in decibels compared to a frequency index. There are five targets and no interferers. Graphs 202 and 208 depict the post-deramp mixer intermediate frequency (IF) signal's spectrogram, in which the target signals are flat tones and interference signal are low pass filtered linear chirps.

Graph 210 shows an analog post-mix and LPF and decimal digital real intermediate frequency (IF) in STFT measured in decibels compared to a frequency index. There are five targets and no interferers. In graphs 204 and 210, the spectrogram of the sampled signals is depicted. Because only real ADC samples are processed the spectrum is conjugate symmetric. In graph 210, the five targets are seen as flat tones in time, while in graph 204 strong interference signals, which present themselves as linear chirps in time, overlay the target flat tones and cause severe interference.

Therefore, severely interfered received signals must be further processed to remove the interference before subsequent processes are carried out. Without effective mitigation performance can be greatly degraded.

Figure 3:
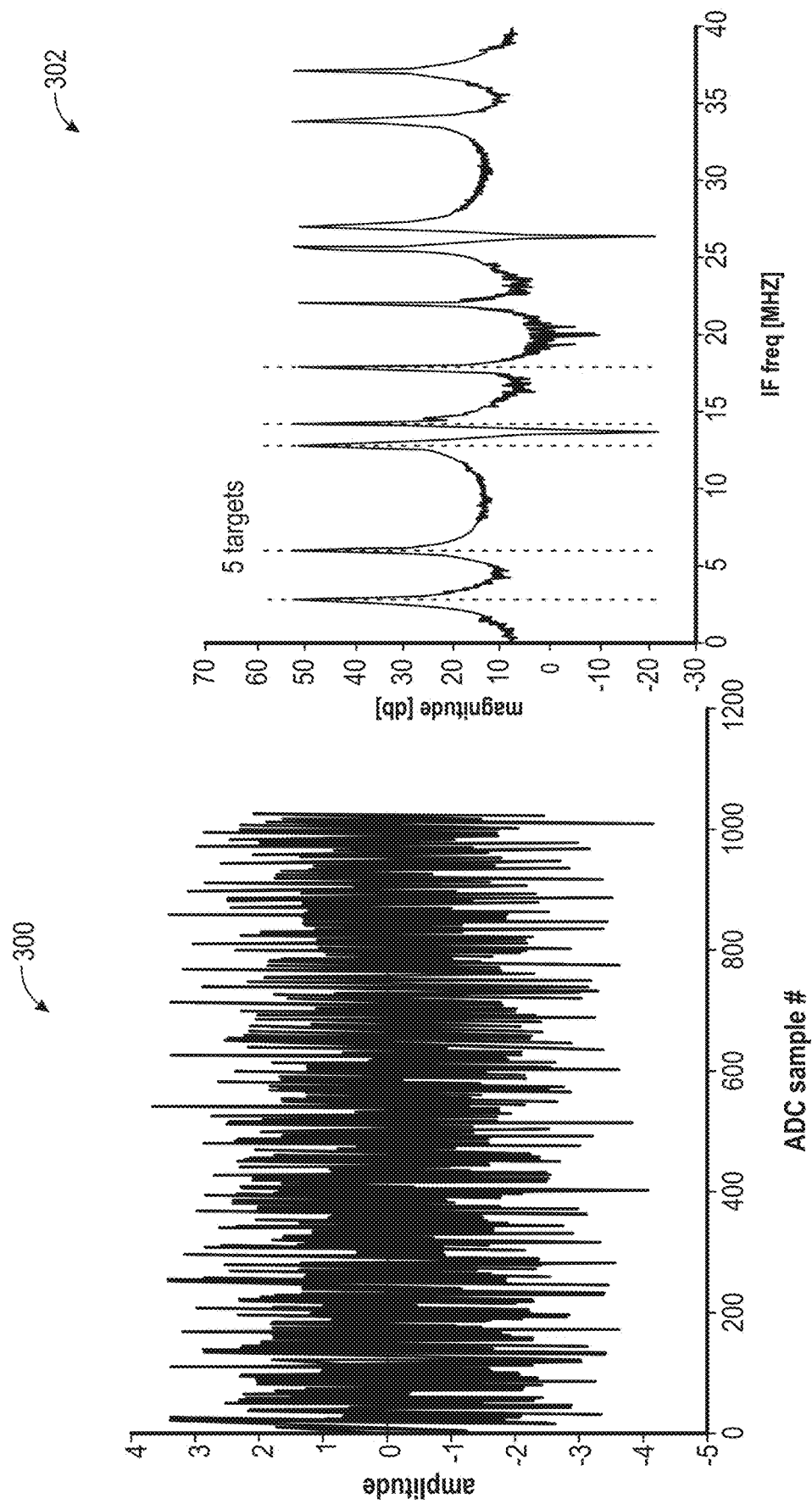
FIG. 3 illustrates analog to digital converted (ADC) sample signals and range spectrum of a receiving antenna.

FIG. 3 shows analog to digital converted (ADC) sample signals and range spectrum of a receiving antenna. Graphs 300 and 302 show an interference free scenario of five targets, where in graph 302 shows the five targets in the range spectrum. Graphs 304 and 306 show a severe interference scenario in which five targets are blocked by the interference, where in graph 306 the targets cannot be clearly seen in the range spectrum.

Mitigation approaches can be used, results of which are shown in graphs 308, 310, 312 and 314. The results of graphs 308 and 310 are derived from a time-domain thresholding and zeroing approach. As can be seen in graph 310, the target range spectrum cannot be recovered correctly because the interference is severe and is not localized in time. The results of graphs 312 and 314 are derived from time-frequency-domain thresholding and zeroing approach. As can be seen in graph 314, the target range spectrum is reasonably well recovered with some degradation in signal to noise ratio (SNR) and some spurious sidelobes/false peaks. Even though the time-frequency domain thresholding and zeroing approach is somewhat effective against severe interference scenarios, further improvement in SNR and sidelobe reduction are needed to achieve the desired performance level. For example, comparison of graph 314 to graph 302 shows there is significant room to improve.

Figure 4:
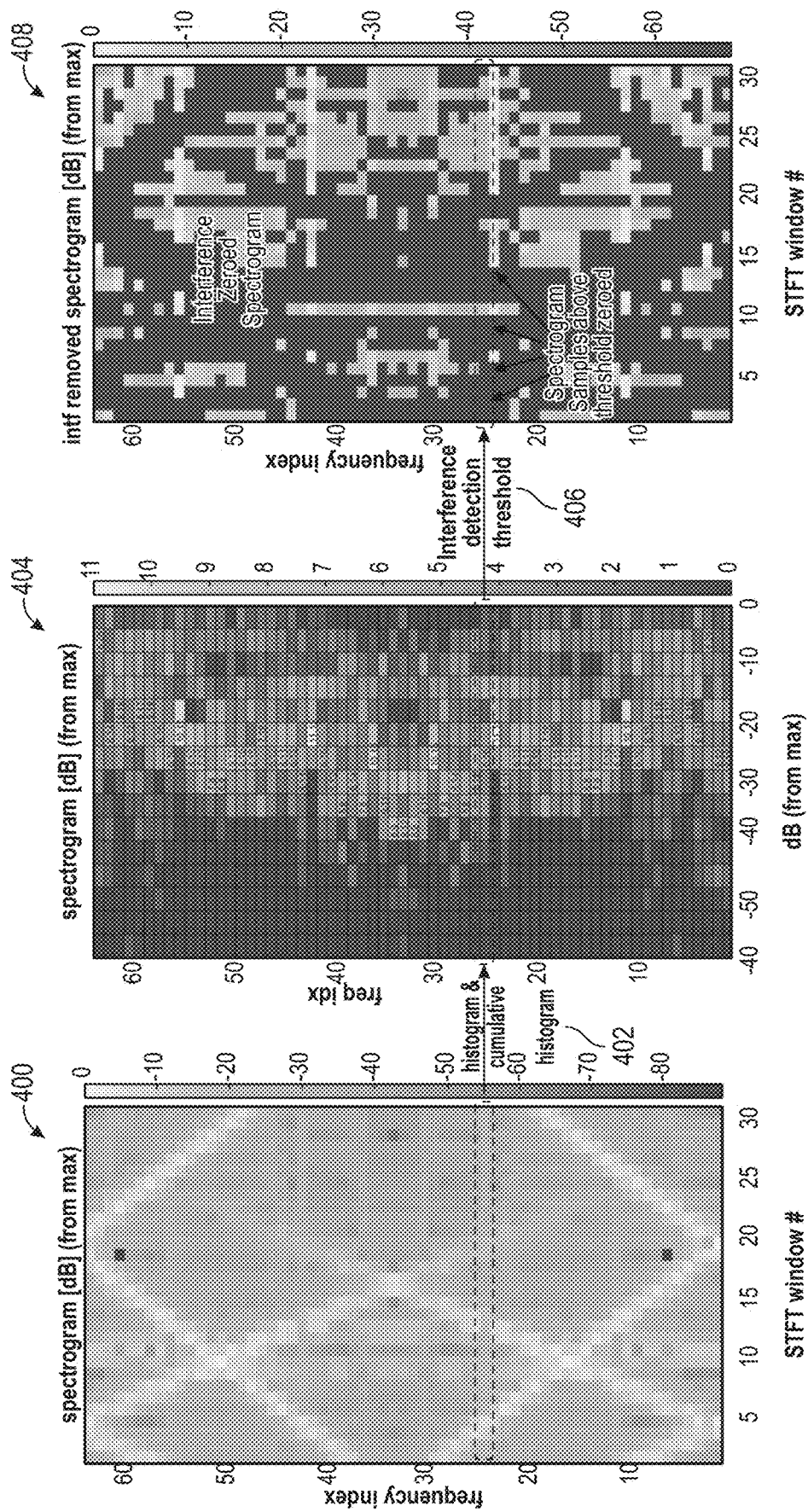
FIG. 4 illustrates intermediate results of time-frequency spectrogram thresholding and zeroing interference mitigation process for one receiving antenna channel.

FIG. 4 shows intermediate results of time-frequency spectrogram thresholding and zeroing interference mitigation process for one receiving antenna channel. The process starts with computing the spectrogram of ADC samples, which is depicted in graph 400. Next, for each STFT frequency (i.e., a sample row), as represented by 402, the histogram of the absolute amplitudes (across STFT window time) is computed, and the cumulative histogram is also produced. Based on the histogram count and cumulative histogram count of the histogram peak, which can also be performed with other statistic metrics, as shown in graph 404, a detection threshold is estimated for each STFT frequency for identifying interference corrupted histogram cell that needs to be suppressed as represented by 406. Next, the spectrogram cells with absolute amplitudes greater than their corresponding thresholds are set to zero. The interference-zeroed spectrogram is inverse-STFT back to the time domain and FFT to obtain range spectrum as shown in graph 408.

The zeroing of the spectrogram samples removes most interference signals; however, in the process, target signals are also removed. The effect of these zeroed samples is analogous to missing time-frequency domain samples. As a result, the process reduces the signal to noise (SNR) ratio and produces ambiguous sidelobes in the range spectrum. The quasi-random nature of the zeroing pattern results in raised sidelobe floor in the range spectrum and the subsequent Doppler spectrum. To mitigate these issues, thresholding is performed that results in more precise removal of interference signals.

The removed interference spectrogram samples are discarded in the processes that are previously described; however, such processes can be wasteful, since the interference spectrogram samples can contain useful information about interference targets. Utilization of the removed interference spectrogram samples is performed to achieve better overall system performance.

A time frequency antenna domain spectrogram thresholding and interference suppression and estimation is performed. To cancel the interference, instead of zeroing out the amplitude of affected analog to digital converted (ADC) sample signals, the thresholding and zeroing out of interference components is performed in time frequency antenna domain. In other words, in the spectrograms of multiple antennas up to all antennas. Interfering Linear Frequency Modulation (LFM) radar signals present themselves as low-pass filtered linear-ramp signals (i.e., chirps) after the deramp mixing, as opposed to target signals which are flat tones. It is expected to see distinct non-zero-slope linear features in the spectrogram for all interference signals and these post-mixer interference "chirps" crossing targets' flat tones in time and frequency. As a result, by identifying spectrogram samples that likely belong to interference, it is possible to remove such spectrogram samples more precisely and causes less degradation to target signals.

Once the interference components are removed in the time-frequency-antenna domain, it may be possible to convert the spectrogram back to time-domain ADC samples and conduct the subsequent processes as usual. The removed spectrogram samples can be buffered in a separate interference spectrogram cube for estimating interference incident direction of arrival (DoA) and interference chirp parameters for assisting the identification and localization of the interfering targets. Since interferers are most likely radar systems of other surrounding automobiles. The interferers carry useful information about these objects in the drive scene. The estimated DoAs and interference chirp parameters (as identification of the interferers) are passed on to a fusion processor (i.e., interference localization fusion processor 174) to determine the precise locations of the interfering targets.

Figure 5:
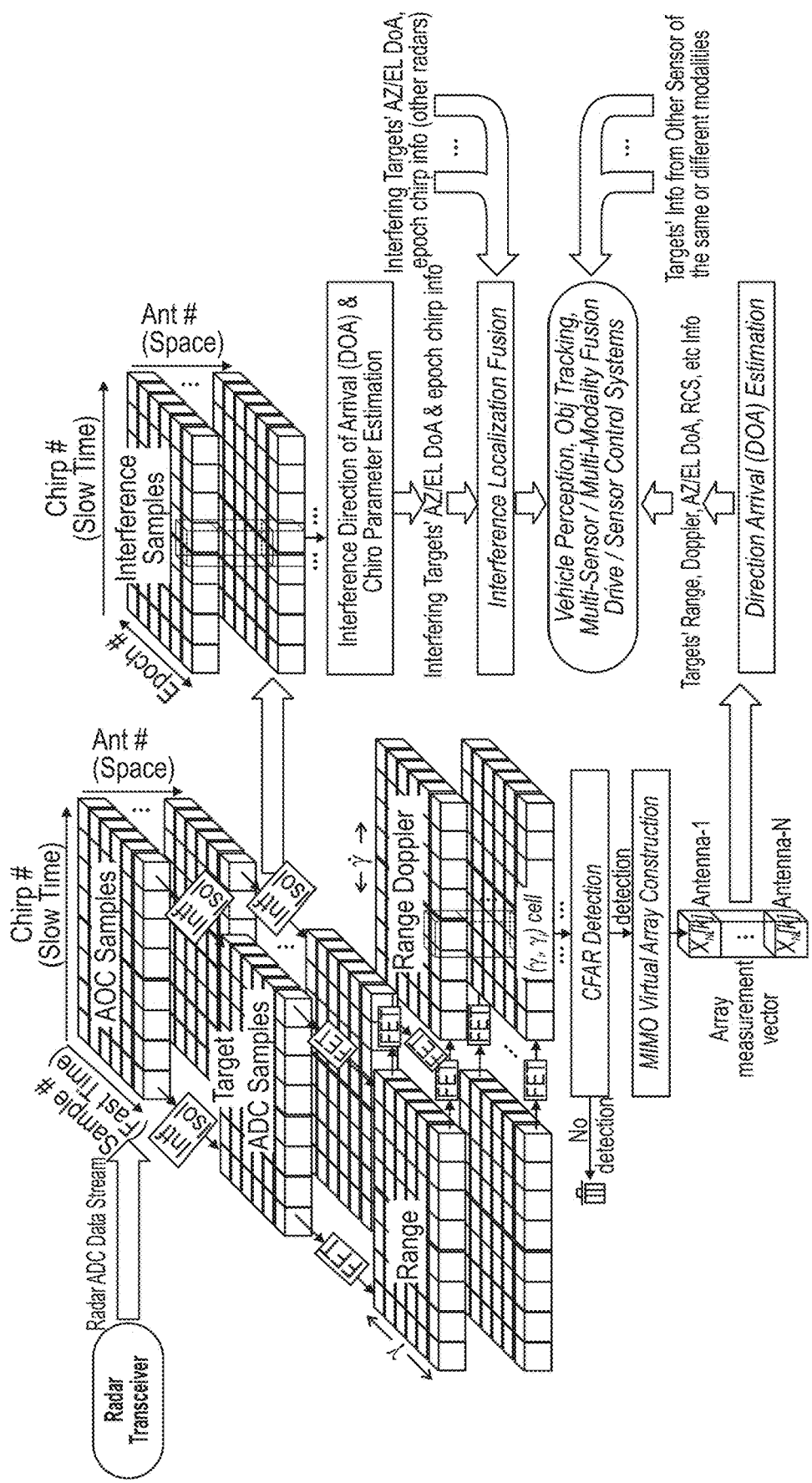
FIG. 5 illustrates a general digital signal processing (DSP) flow of components and actions of the systems and methods described herein.

FIG. 5 shows a general digital signal processing (DSP) flow of components and actions of the systems and methods described herein. In particular, what is shown is DSP flow of the time frequency antenna domain spectrogram thresholding suppression and estimation and interference target localization processing.

Figure 6:
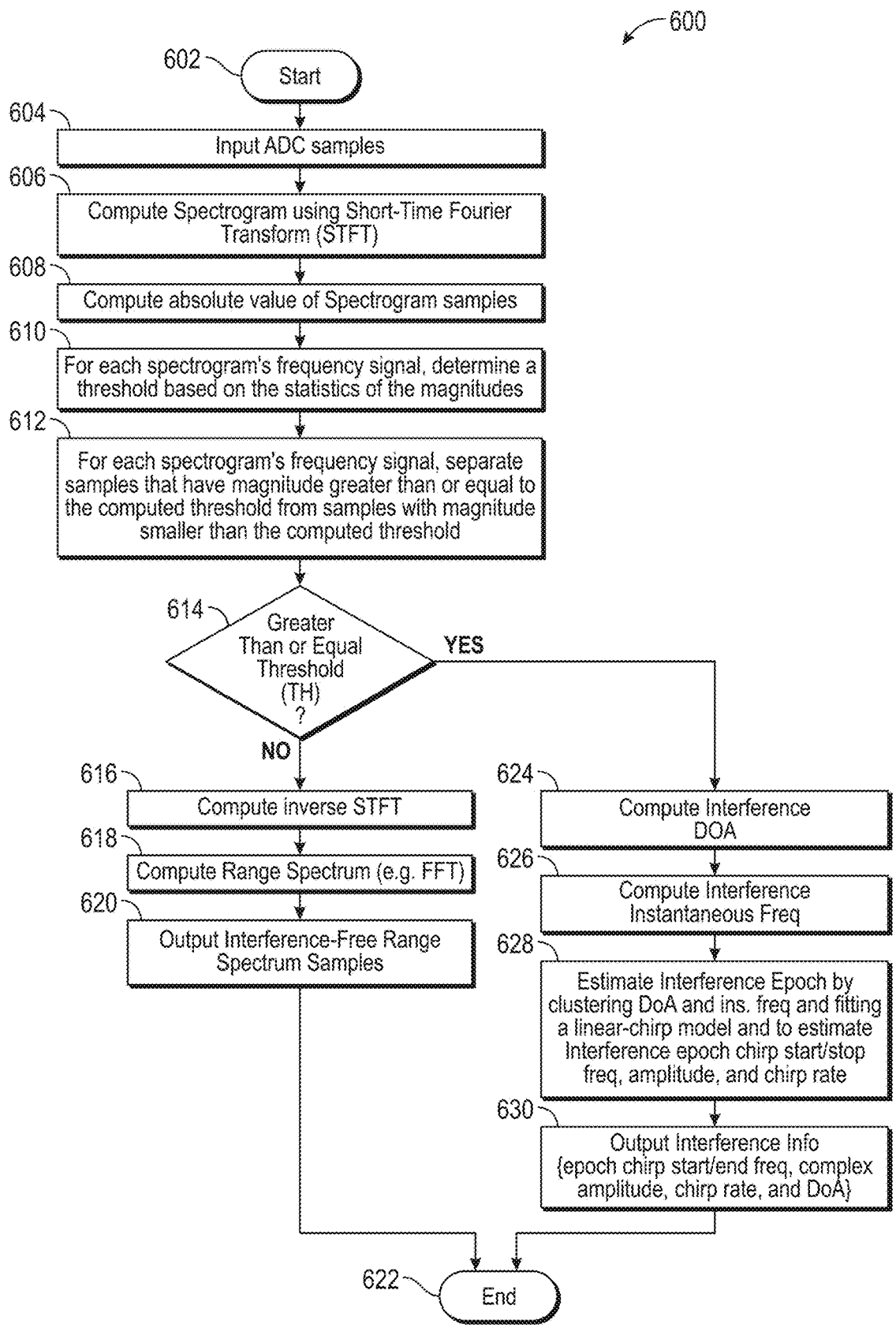
FIG. 6 illustrates a generalized flowchart for time frequency antenna domain thresholding interference suppression and estimation.

FIG. 6 is a generalized flowchart for time frequency antenna domain thresholding interference suppression and estimation. The order in which the method is described is not intended to be construed as a limitation, and any number of the described method steps may be combined in any order to implement the method, or alternate method.

At step 602, the process 600 starts. At step 604, analog to digital converted (ADC) samples are received and inputted. At step 606, using Short Time Fourier Transform (STFT) the spectrogram is computed for each ADC sample. At step 608, the absolute value of the spectrogram samples is computed. At step 610, for each spectrogram frequency signal, a threshold is determined based on statistics of the magnitudes. At step 612, for each spectrogram frequency signal, samples are separated that have a magnitude greater than or equal to the computed threshold from samples with magnitude smaller than the computed threshold.

If a sample is smaller than the computed threshold, or in other words not greater than or equal to the computed threshold, then following the NO branch of 614, at step 616, the inverse STFT is computed. At step 618, the range spectrum (e.g., a Fast Fourier Transform) is computed. At step 620, the interference free range spectrum samples are outputted. At step 622, the process 600 ends.

If a sample is greater than or equal to the computed threshold, then following the YES branch of 614, at step 624, the interference direction of arrival (DoA) is computed. At step 626, the interference instantaneous frequency is computed. At step 628, the interference epoch is estimated by clustering DoA and instantaneous frequency and fitting a linear chirp model, as well as estimating interference epoch chirp start/stop frequency, amplitude, and chirp rate. At step 630, interference is outputted, which can include epoch chirp start/end frequency, complex amplitude, chirp rate, and DoA. At step 622, the process ends.

Figure 7:
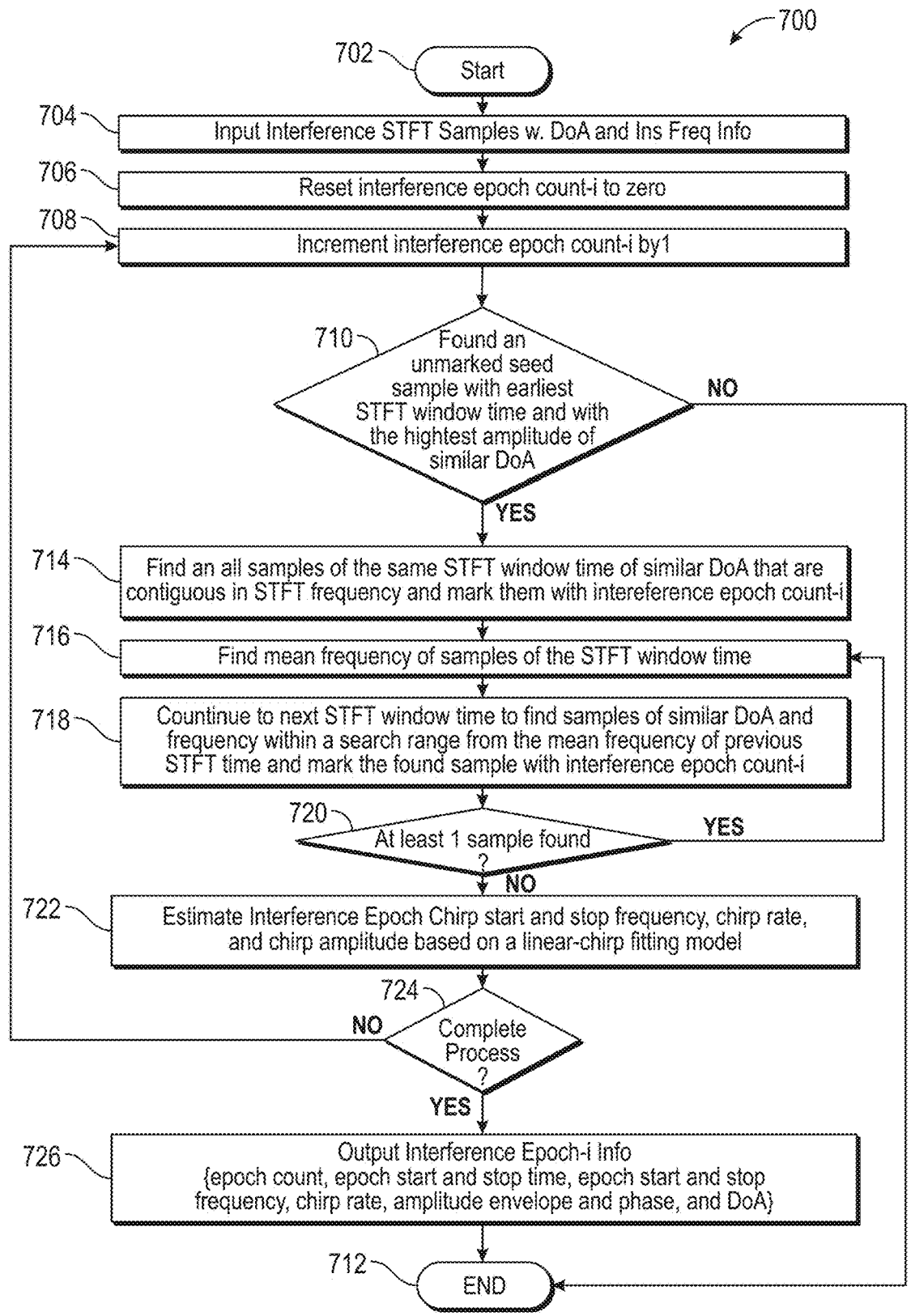
FIG. 7 illustrates a generalized flowchart for interference chirp epoch clustering and estimation processing.

FIG. 7 is a generalized flowchart for interference chirp epoch clustering and estimation processing. The order in which the method is described is not intended to be construed as a limitation, and any number of the described method steps may be combined in any order to implement the method, or alternate method.

At step 702, the process 700 starts. At step 704, the interference STFT samples with DoA and instantaneous frequency information is inputted. At step 706, interference epoch count-i is reset to zero (0). At step 708, interference epoch count-i is incremented by 1 (one).

If an unmarked seed sample with the earliest STFT window time and with the highest amplitude of a similar DoA is not found, following the NO branch of 710, at step 712, the process 700 ends.

If an unmarked seed sample with the earliest STFT window time and with the highest amplitude of a similar DoA is found, following the YES branch of 710, at step 714, all samples of the same STFT window time of similar DoA contiguous in STFT frequency are found and marked with interference epoch count-i. At step 716, the mean frequency of samples of the STFT widow time are found. At step 718, the next STFT window time is continued to find samples of similar DoA and frequency within a search range from the mean frequency of the previous STFT time, and marked the found samples with interference epoch count-i.

If at least one (1) sample is found, then following the YES branch of step 720, step 716 is performed. Otherwise, following the NO branch of step 720, at step 722, estimation is performed as to interference epoch chirp start and stop frequency, chirp rate, and chirp amplitude based in a liner chirp fitting model.

If the process is not complete, following the NO branch of step 724, step 708 is performed. Otherwise, if the process is complete, following the YES branch of step 724, at step 726, interference epoch-i information is outputted, which can include epoch count, epoch start and stop time, epoch start and stop frequency, chirp rate, amplitude envelope and phase, and DoA. At step 712, the process 700 ends.

The described processes start with computing the spectrogram of ADC samples for each receiving antenna channel using Short-Time Fourier Transform (STFT). The STFT process is simply a series of shorter FFTs operated on windowed ADC samples. There can be two parameters that control the STFT process, which are window size and stride size. For an input length-N ADC sample vector, for example $[x_1, x_2, \ldots, x_N]$ is an STFT window size W [samples], and a stride size S [samples], the k-th time-bin STFT output is calculated based on the following equations. It is to be noted that FFT computation can be augmented by standard tapering window to reduce sidelobes in the STFT spectrum.

$$X_{STFT} = \begin{bmatrix} X_{STFT,1} \\ X_{STFT,2} \\ \vdots \\ X_{STFT,K} \end{bmatrix}$$

$$X_{STFT,k} = FFT\{x_{STFT,k}\} \quad (k = 1, 2, \ldots K)$$

$$x_{STFT,k} = [x_{1+(k-1)*S}, \ldots, x_{W+(k-1)*S}]$$

Figure 8:
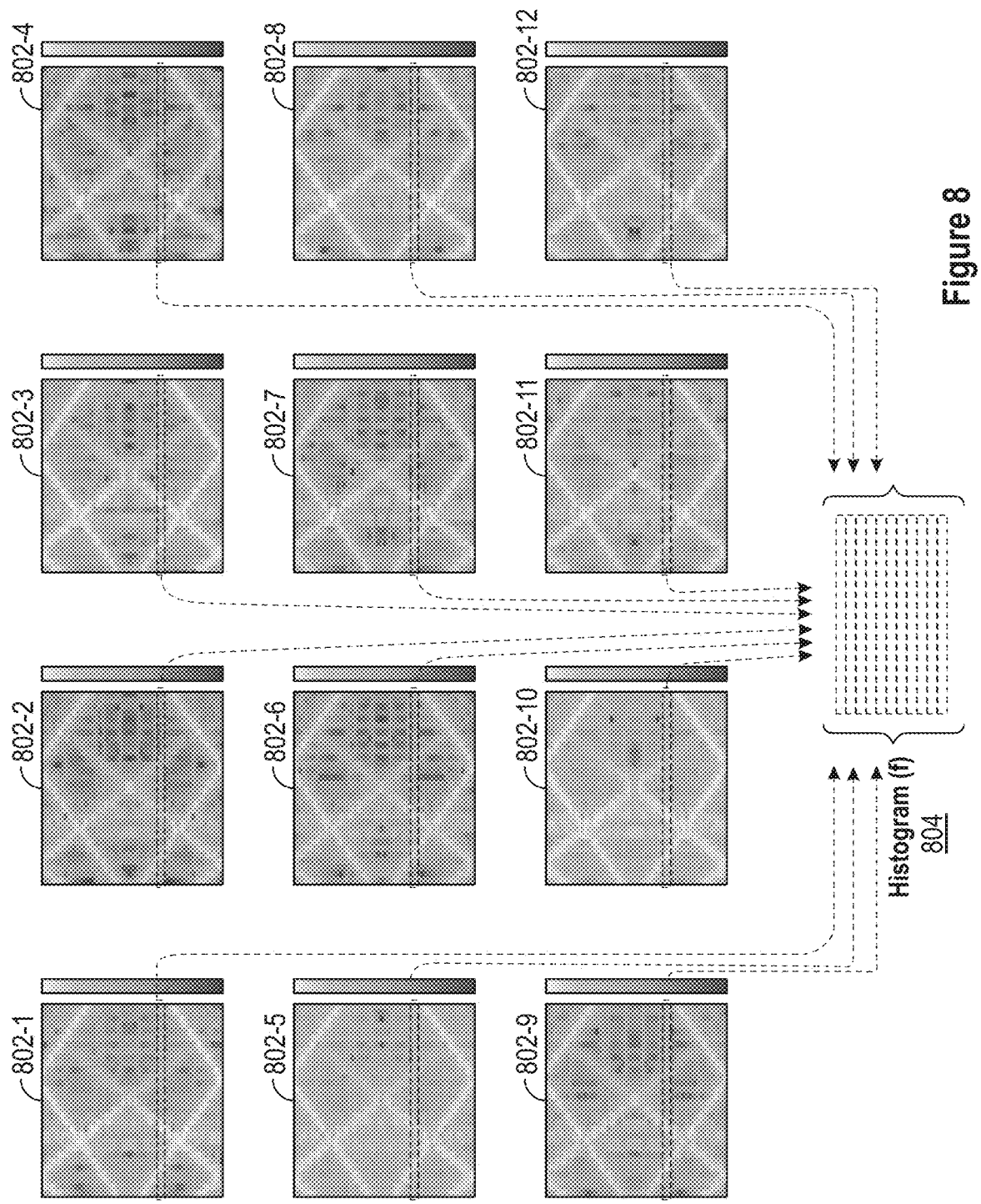
FIG. 8 illustrates spectrograms of a system with twelve receiving antennas for a severely interfered scenario.

FIG. 8 shows spectrograms of a system with twelve receiving antennas. The outputs of spectrograms 802-1 to 802-12 represent a twelve-antenna system for a severely interfered scenario. A raw spectrogram decibel value (from maximum) (x-axis) are plotted against STFT frequency index (y-axis) for each antenna of the spectrograms 802-1 to 802-12. Crisscrossing of interference chirps from three strong interferers can be seen in the spectrograms 802, where there is blocking of underlying target signals or five flat tones.

As an example, statistic method to compute the zeroing threshold, for each STFT frequency, the frequency signal's magnitudes or absolute values are computed and then a histogram 804 is produced based on the magnitudes of the STFT frequency of the twelve antennas, as shown in FIG. 8, in which the spectrogram samples of a notional (theoretical) frequency "f" of all twelve antennas are extracted and combined into a large set of samples in which the histogram 804 is computed. The use of all spectrogram samples in computing the histogram 804 can provide an advantage over time-frequency spectrogram thresholding and zeroing approach, where the histogram is computed using samples from only a single antenna.

Figure 9:
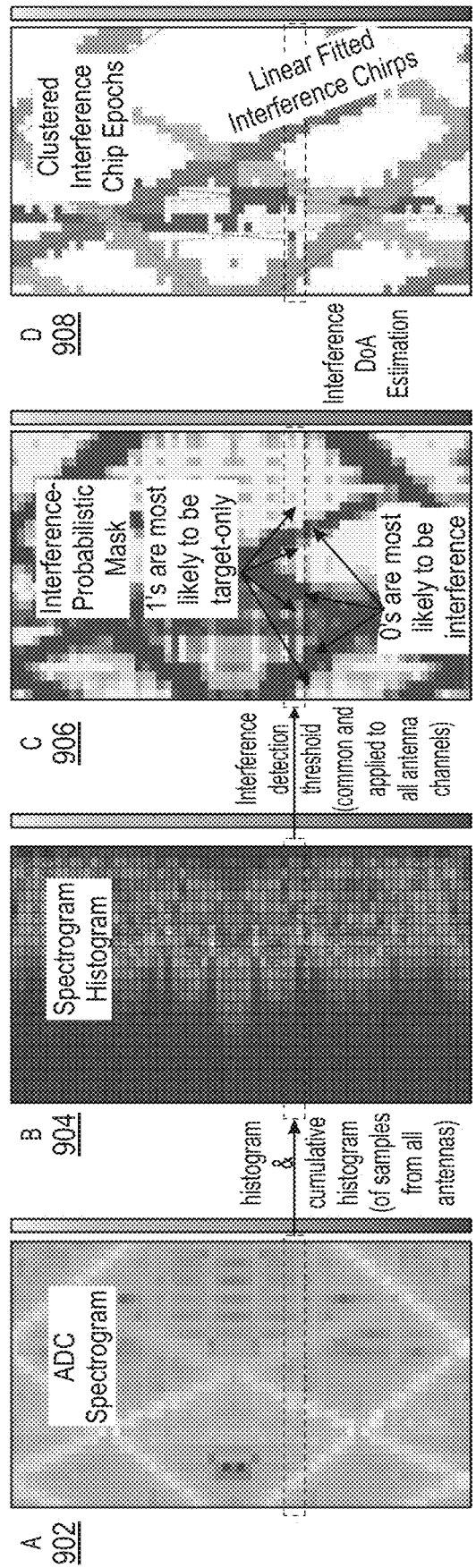
FIG. 9 illustrates intermediate results of a time frequency antenna domain thresholding process.

FIG. 9 shows intermediate results of a time frequency antenna domain thresholding process. Spectrogram B 904 shows example histogram outputs for a spectrogram. A threshold can be computed for each STFT frequency based on the histograms. The resulting threshold has significant higher statistical strength due to the larger amount of data points.

In an example, the threshold is determined based on the peak count and the cumulative count (sum of all counts from the lowest-value bin to the peak bin) of the peak bin using the following equation. The "Narrowing Factor" controls the size of zeroing. The larger the value the fewer samples will be zeroed. Typical values may be between 1~3. It should be understood that the method described herein provides an example of calculating the threshold value and other methods that are suitable to identify a threshold for separating the interference from targets and noise can also be used.

$$TH = \text{Peak Bin Magnitude} + \text{Bin Width} *$$
$$\left(\text{Narrowing Factor} - \frac{\text{Accumulative Peak Bin Count} - \text{Peak Bin Count}}{\text{Peak Bin Count}}\right)$$

Based on the computed threshold for each STFT frequency, an interference zeroing mask can be computed for each antenna. A spectrogram cell is zeroed if its absolute amplitude is greater than the corresponding threshold.

Figure 10:
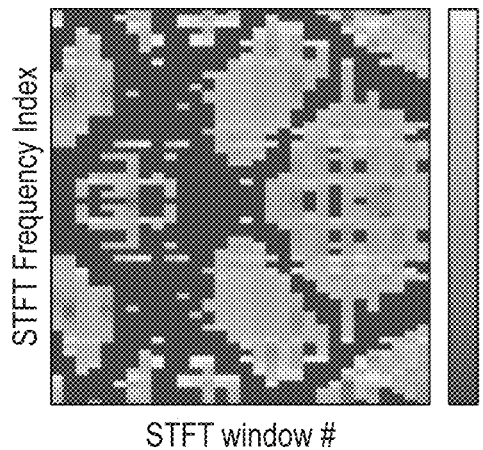
FIG. 10 illustrates threshold spectrograms of twelve antenna channels of the severely interfered scenario.
Figure 10:
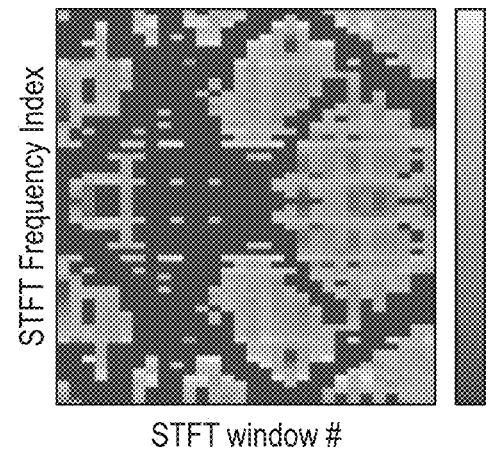
Figure 10:
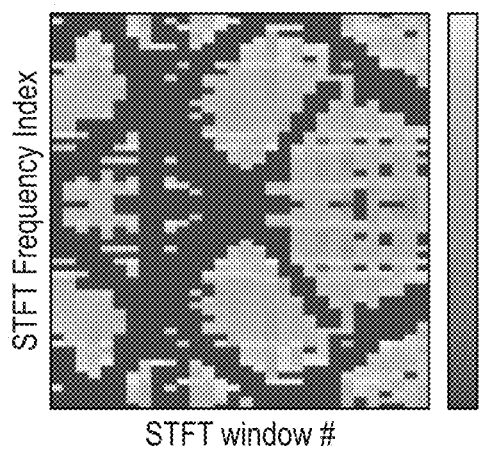
Figure 10:
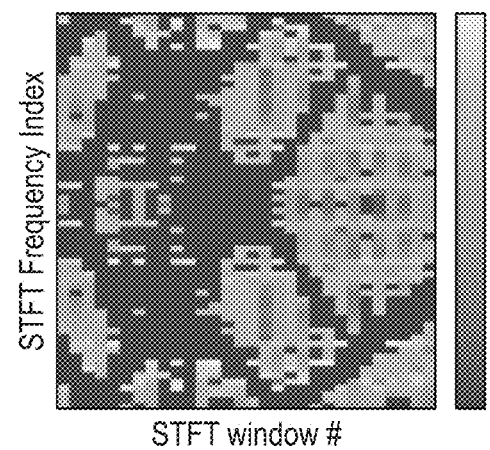
Figure 10:
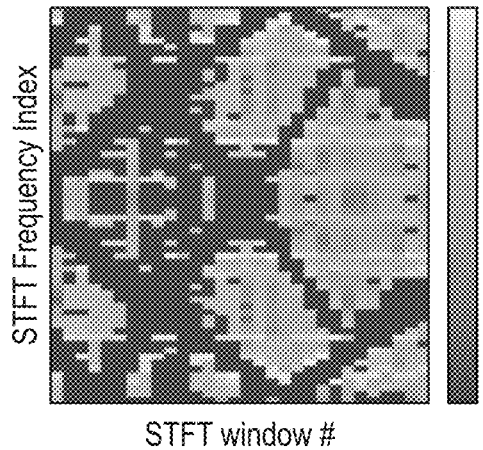
Figure 10:
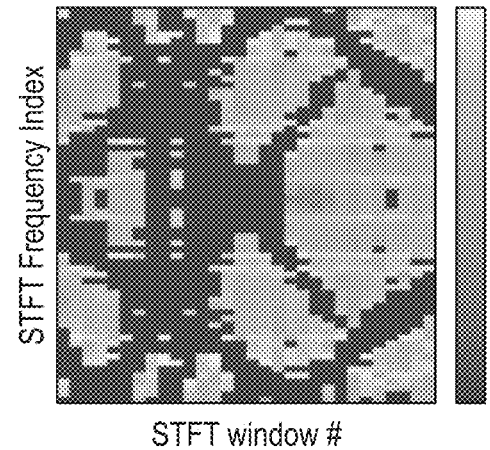
Figure 10:
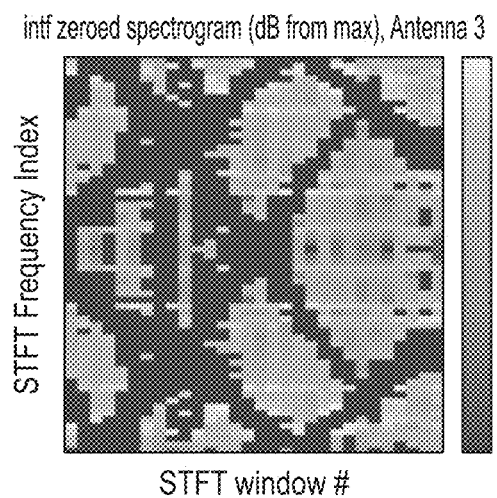
Figure 10:
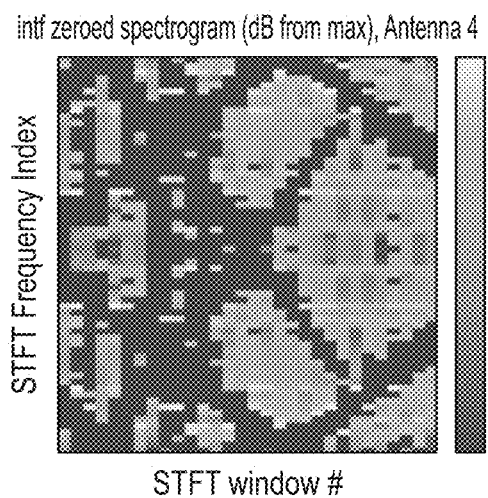
Figure 10:
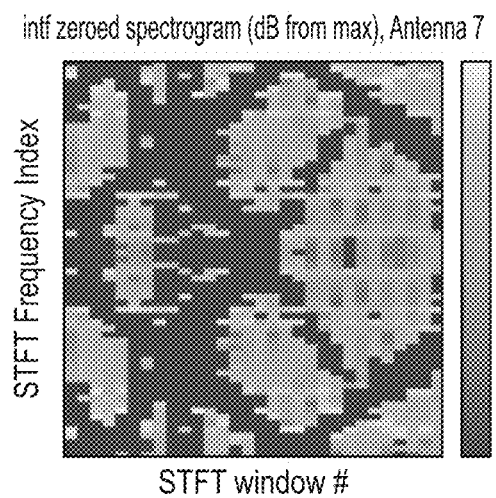
Figure 10:
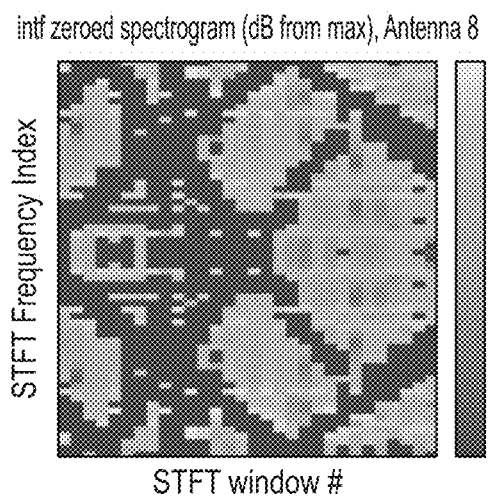
Figure 10:
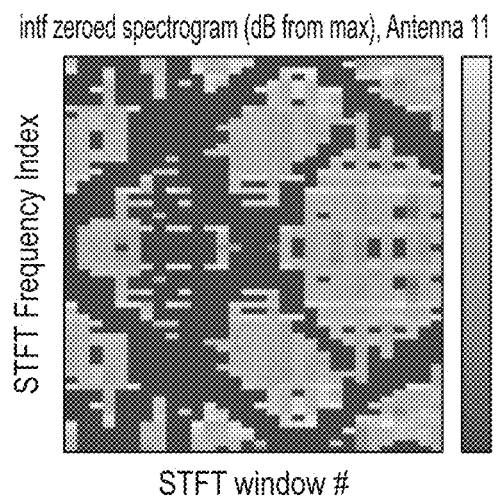
Figure 10:
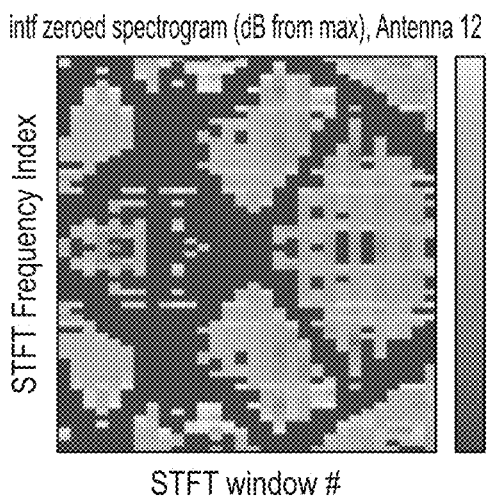

FIG. 10 shows threshold spectrograms of twelve antenna channels of the severely interfered scenario. An example of interference zeroed spectrograms of twelve antenna channels are shown. The zeroed spectrograms are represented by the darken areas, which can be considered as a product of the original spectrogram and a binary mask with 0's corresponding to the zeroed cells and 1's corresponding the non-zeroed cells. Using an antenna's binary zeroing masks, a final interference probabilistic mask is computed by averaging the 0/1 masks. The result is a mask with cell values ranging between 0 and 1, where 1 indicating the highest probability of containing targets only and 0 indicating highest probability containing interference. Referring back to FIG. 9, an n example result is shown as graph C 906.

Referring back to FIG. 10, the probability mask can be used as a soft zero thresholding as element wise product weights that are applied to the antenna spectrograms to suppress interference. Implementations can also provide for the probability mask to be used as hard thresholds by further defining a probability threshold below which a cell should be zeroed and above (or equal to) which the cell is unmodified. For example, a spectrogram cell with an interference probabilistic value of lower than a probability threshold (e.g., 0.5) can be considered as a suspected corrupted cell which should be removed and placed into the interference spectrogram cube. This process can be carried out until all interference cells are separated from target-only cells.

For the target-only spectrograms, an inverse STFT of the spectrograms are computed to reconstruct the ADC samples for each antenna and then the range FFT can be attempted. The resulting FFT has interference suppressed, and targets can be revealed more clearly in the range spectrums.

Figure 11A:
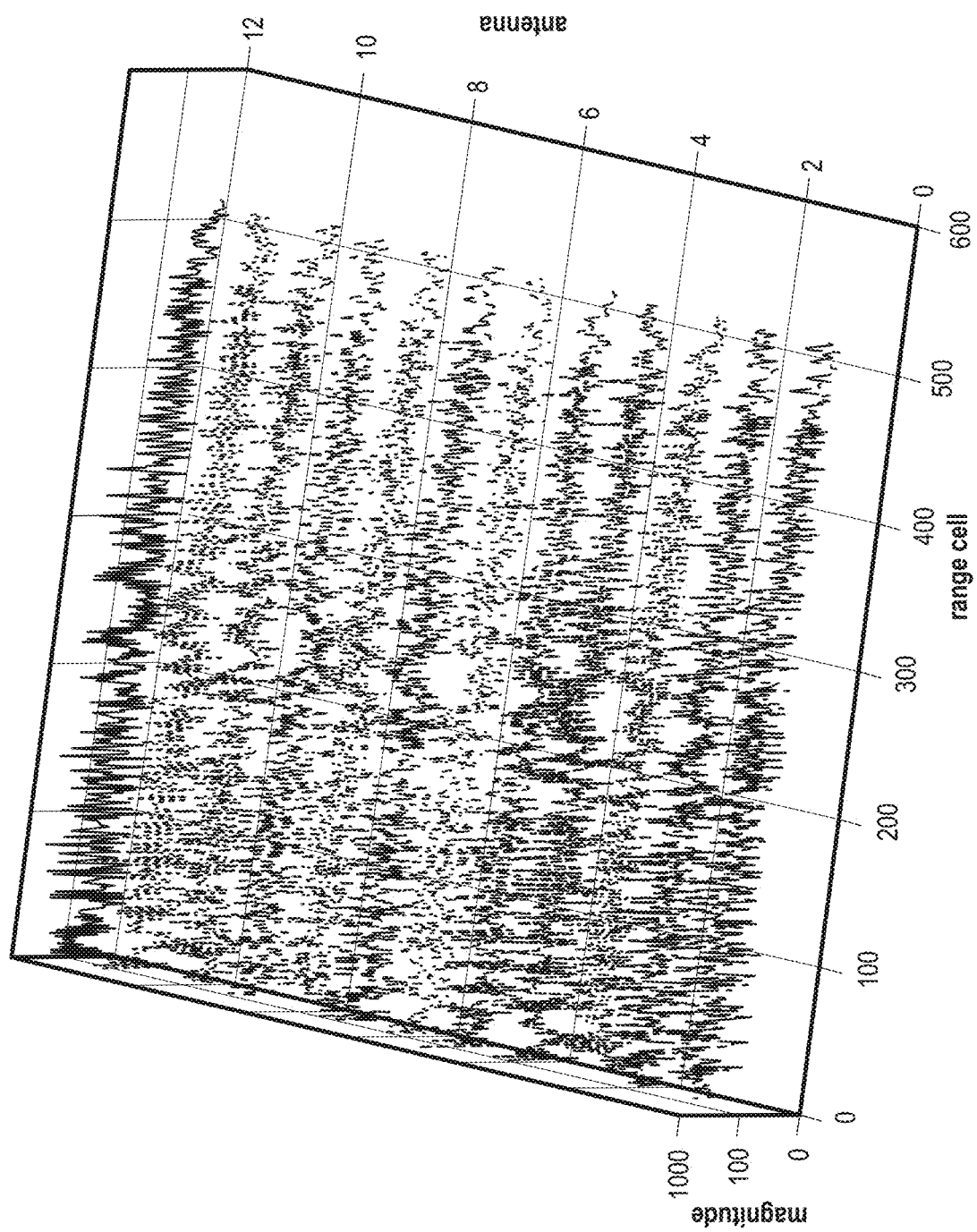
FIG. 11A illustrates corrupted range spectrums of a twelve antenna under severe interference condition.
Figure 11B:
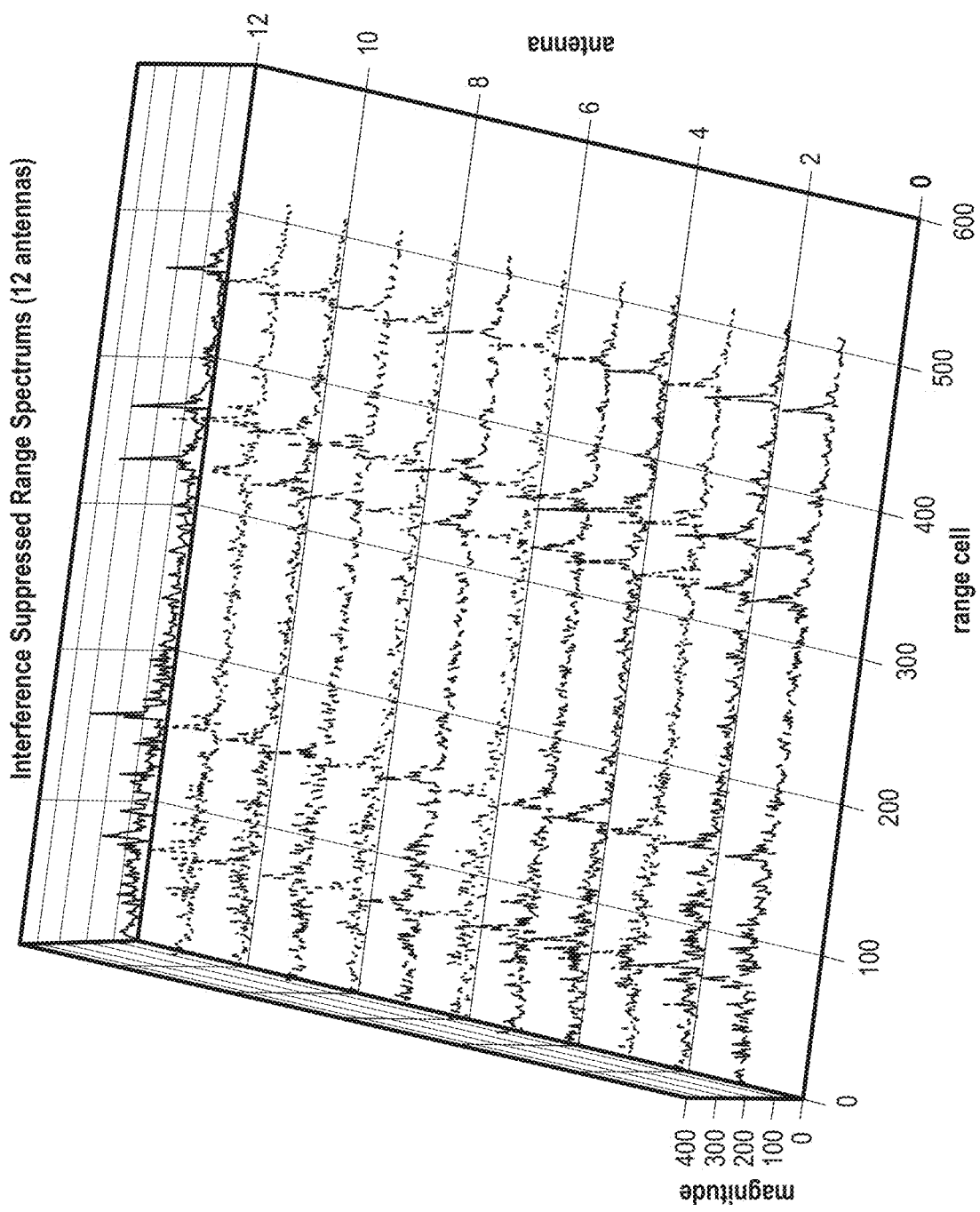
FIG. 11B illustrates interference suppressed range spectrums of a twelve antenna under severe interference condition.

FIG. 11A shows corrupted range spectrums of a twelve antenna under severe interference condition, where the described processes are not applied. FIG. 11B shows interference suppressed range spectrums of a twelve antenna under severe interference condition, where the described process are applied.

Figure 12:
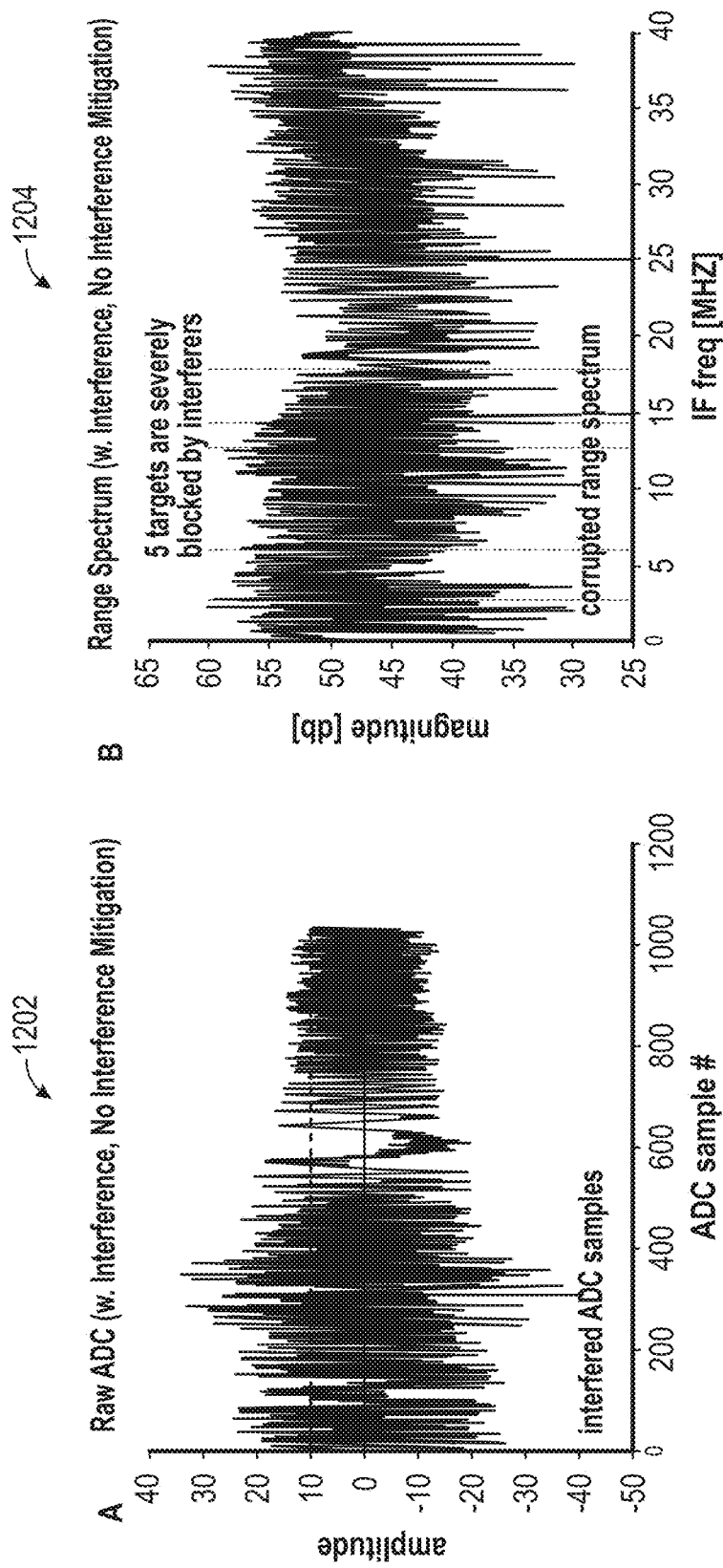
FIG. 12 shows spectrums based on the described approaches and previous approaches.
Figure 12:
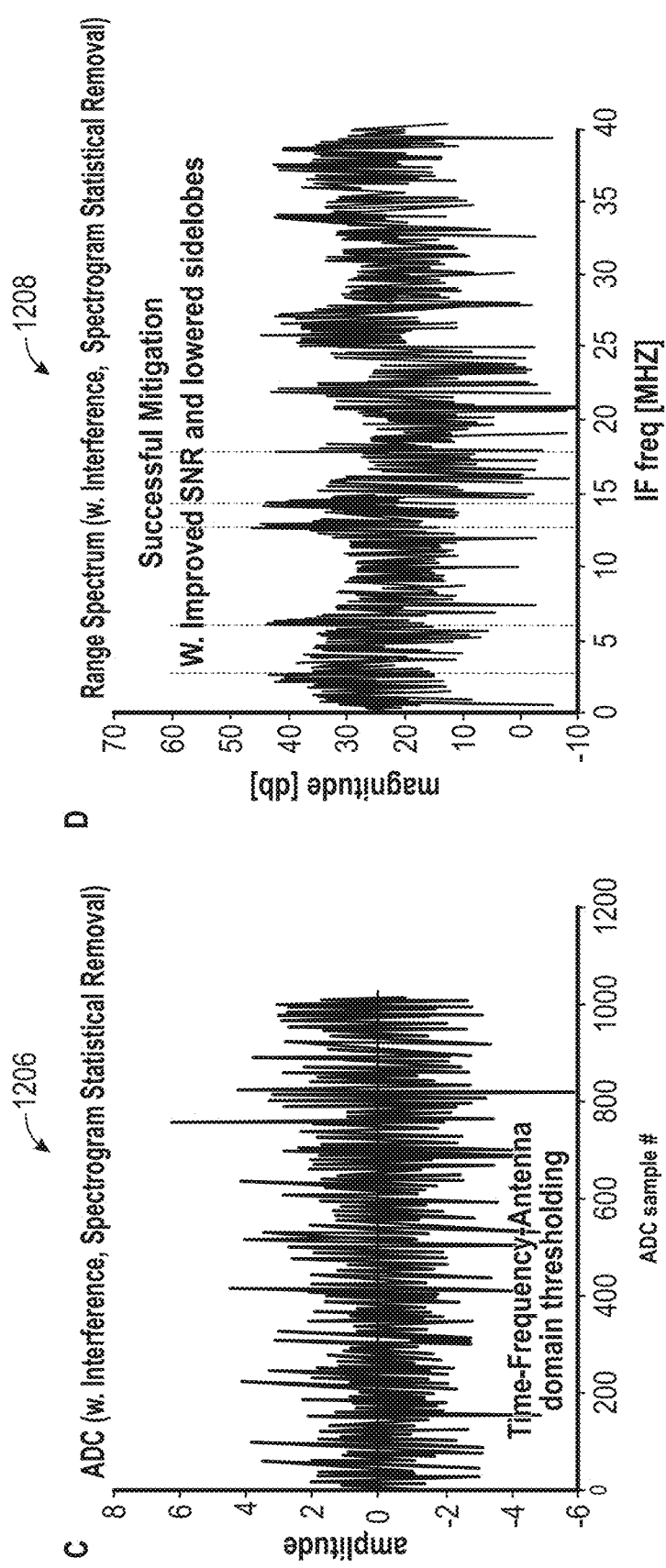
Figure 12:
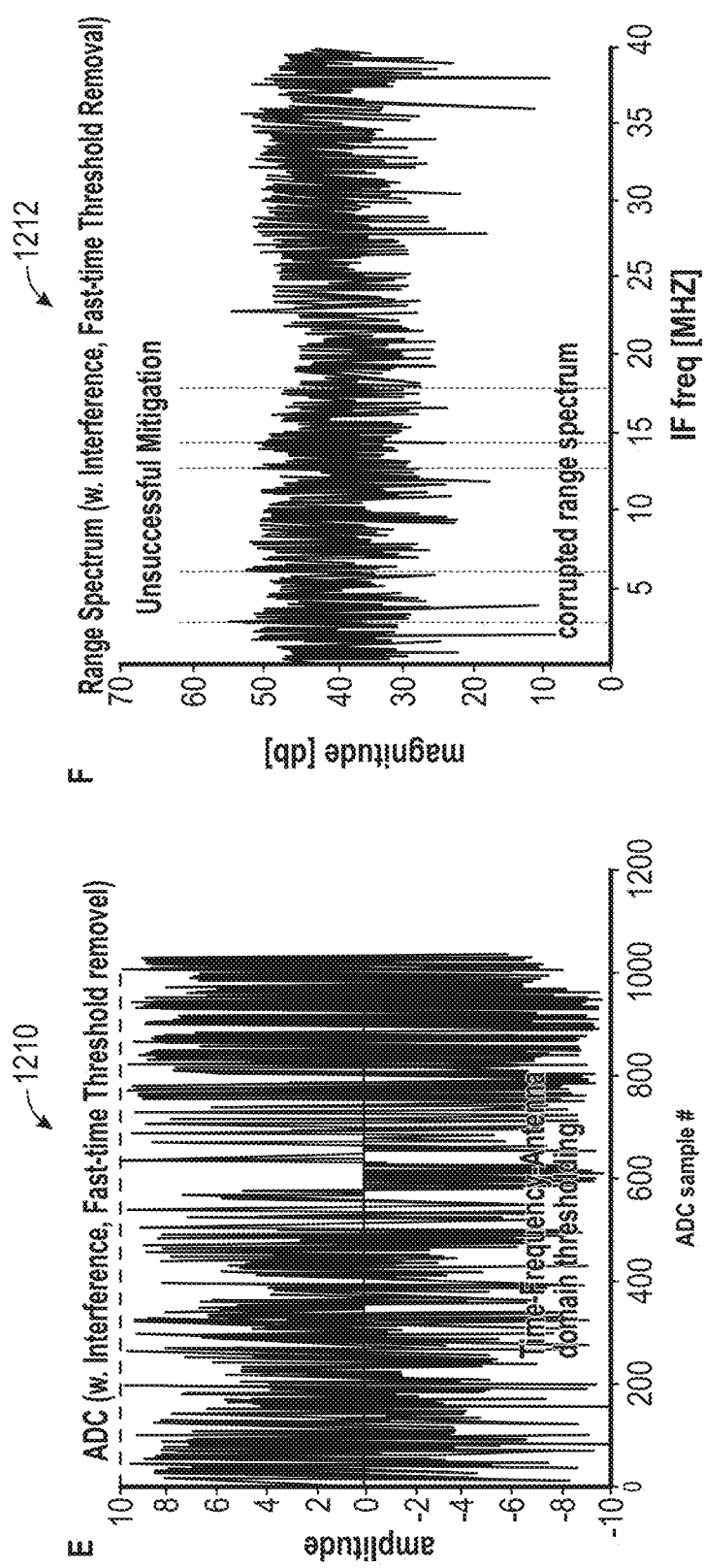
Figure 12:
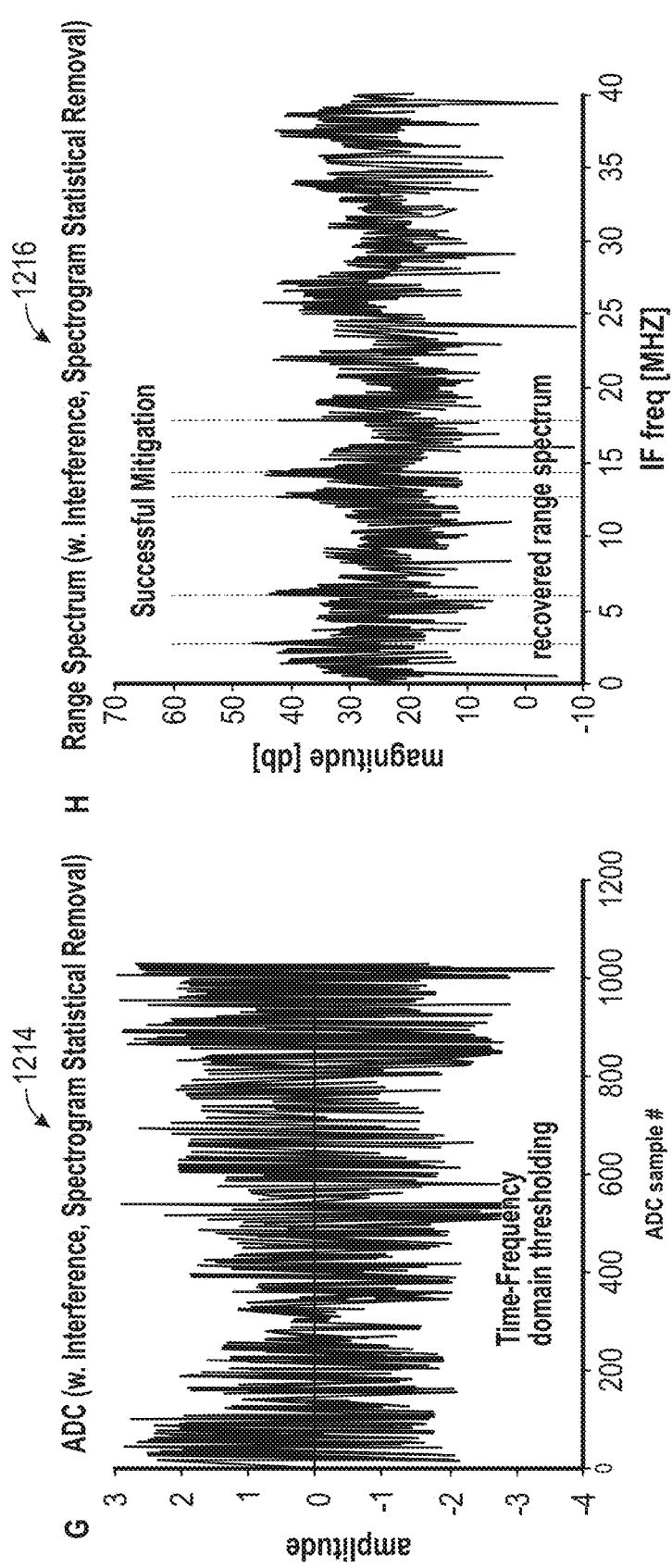

FIG. 12 shows spectrums based on the described approaches and previous approaches. Graphs 1202 and 1204 are unmitigated examples. Graphs 1206 and 1208 are based on the described approaches. Graphs 1210, 1212, 1214, and 1216 are based on previous approaches.

Graphs 1202 and 1204 are an ADC sample and range spectrum of severe-interference case. Graph 1202 is a raw ADC sample with interference with no interference mitigation. Graph 1204 is range spectrum with interference with no interference mitigation.

Graphs 1206 and 1208 are severe interference with described time-frequency-antenna-domain thresholding mitigation. Graph 1206 is an ADC sample with interference and spectrogram statistical removal. Graph 1208 is range spectrum with interference and spectrogram statistical removal.

Graphs 1210 and 1212 are severe interference with prior-art simple time-domain thresholding mitigation case. Graph 1210 is an ADC sample with interference and fast time threshold removal. Graph 1212 is range spectrum with interference and fast time threshold mitigation.

Graphs 1214 and 1216 are severe interference with prior-art time-frequency-domain thresholding mitigation case. Graph 1214 is an ADC sample with interference and spectrogram statistical removal. Graph 1216 is range spectrum with interference and spectrogram statistical removal.

Once the interference signal is removed from the spectrograms, a time-domain signal, ADC samples with interference suppressed, can be reconstructed for further processing. The reconstruction of the ADC samples can be achieved by reversing the STFT process using inverse STFT for each antenna channel.

$\check{X}_{STFT,k}$ is denoted as the k-th row of the spectrogram matrix after the thresholding and zeroing process is completed. The inverse STFT computes the k-th short-time window signal using the following equation.

$$\check{x}_k = IFFT\{\check{X}_{STFT,k}\} = [\check{x}_{k,1+(k-1)*S}, \ldots, \check{x}_{k,W+(k-1)*S}]$$

It is noted that if a tapering window is applied in the forward STFT process, an inverse tapering window may be used to recover the time domain samples with correct amplitudes. The potential use of inverse tapering window may be implied.

The process can be repeated for each row of the interference-suppressed spectrogram to obtain the short-time window signal. The final ADC sample stream can be reconstructed from the overlapped short-time window signal by taking the mean of the multiple values for each ADC sample position. It is noted that when the stride equals the window length, there may not be overlap and the reconstructed ADC sample stream is simply a concatenated version of the IFFT outputs.

Implementations further provide for processing of interference spectrogram samples that are isolated in a prior threshold detection step. For each spectrogram cell, an interferer's DoA is estimated using the spectrogram-cell measurements from all antennas. For example, standard DoA estimation approaches such as FFT, DFT (discrete FT), and beamforming can be used. Other algorithms may also be used to recover high-resolution DoA information. Referring back FIG. 9, clustered interference chip epochs shown in D 908 is an example result of DoA estimation where estimated DoA (index value) can be color coded, or shade differentiated and plotted for each interference spectrogram cell. It can be observed that spectrogram cells of the same interference source tend to have similar DoA estimates. As a result, the DoA information naturally clusters samples of distinct interferers. The clustering of individual interference chirps using interference spectrogram and DoA information is a feature of the described processes and system.

Referring back to FIG. 7, the process 700 shows clustering of interference chirps. An iterative clustering process starting with the strongest and earliest "seed" cell can used for growing the cluster. Neighboring cells of the same DoA are grouped to form an interference chirp "epoch" until no common-DoA neighboring cells are found, and the process repeats itself with the remaining associated cells until all cells are associated to an epoch. Epochs with few cells or insufficient time span are neglected for the subsequent processing.

For each interference chirp epoch, a linear fit is attempted to find the starting frequency and chirp slope. $\{t_i, f_i\}$, i=1 . . . M is denoted as a spectrogram cell associated to t chirp epoch; $f_0$ is denoted as the chirp starting frequency at time zero and $\dot{f}$ denoted as the chirp slope; and vector v, a and matrix T are defined in the equation below. Solving for a, linear regression methods can be used, such as the following pseudo inverse below.

$$v = Ta$$

-continued $$\begin{bmatrix} f_1 \\ f_2 \\ \vdots \\ f_M \end{bmatrix} = \begin{bmatrix} t_1 & 1 \\ t_2 & 1 \\ \vdots & \vdots \\ t_M & 1 \end{bmatrix} \begin{bmatrix} f \\ f_0 \end{bmatrix}$$

$$\hat{a} = (T^H T)^{-1} T^H v$$

Example linear fitting results are depicted in FIG. 9, D 908, which shows found linear chirps. It is to be noted that conjugate symmetric is seen due to real ADC sample processing. As a result, the interference chirps are also symmetric (with anti-symmetric DoA due to complex conjugation of the samples). This DoA ambiguity can be resolved in a subsequent fusion stage. Obtained DoA and chirp parameter information of each interference chirp epoch can be reported to a fusion processor for further association with epochs from other sensors and in time. It is noted that chirp starting and stopping frequency as well as the chirp slope may need to be converted back to pre-mixer value by compensating for the known reference chirp frequency ramp applied at the deramp mixer. Note that other methods, such as Hough transform, Radon transform, Fractional Fourier transform, Chirp-Z transform, etc. can also be used for refining the estimating the parameter of the linear feature either in the spectrogram domain or in the time domain.

Figure 13A:
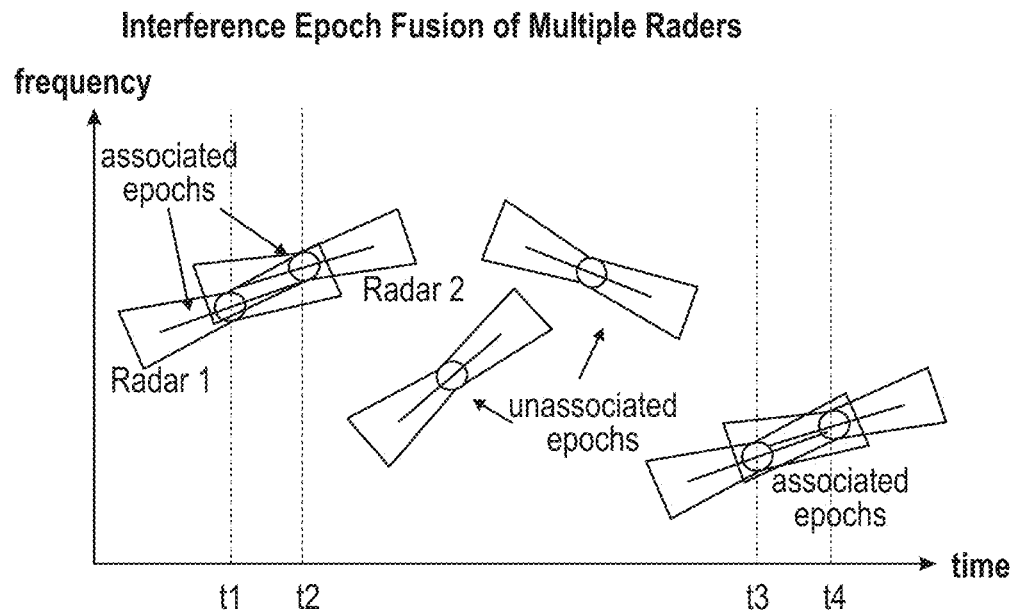
FIG. 13A illustrates interference chirp epochs of two radars units that are present and associated.
Figure 13B:
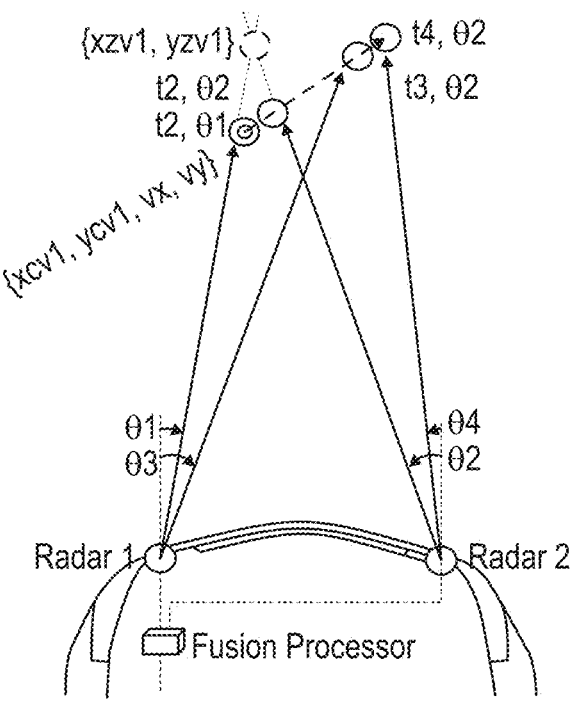
FIG. 13B illustrates location and estimation by triangulation for associated epoch pairs.

At the interference target localization fusion processor (interference localization fusion processor 174 of FIG. 1B), interference chirp epochs that are correlated in time, frequency, and chirp rate are associated and target locations can be estimated by means of triangulation using the DoA's and sensor locations. FIGS. 13A and 13B show a theoretical/notional process. In FIG. 13A, interference chirp epochs of two radars units are present and associated. For each associated epoch pair, location is estimated by triangulation as depicted in FIG. 13B. Simple angle-angle triangulation can be used assuming stationary target or negligible target motion. Multiple epoch pairs in different time can also be used for computing the trajectory of a target. A constant-velocity case is depicted. Standard tracker and Kalman-filter based fusion may be used for producing better-quality results. It is to be noted that knowing the interference spectrum and scheduling also can allow a radar system to change the timing and center frequency in such a way to minimize collision with that interferer in the future.

Implementations provide for further time frequency, antenna domain spectrogram thresholding and interference isolation, estimation, and cancellation. As an incremental improvement to the previously described implementations, the interference signal in ADC samples may be directly cancelled by reconstructing an interference signal ADC sample using the estimated chirp parameters of the interference chirp epochs.

Figure 14:
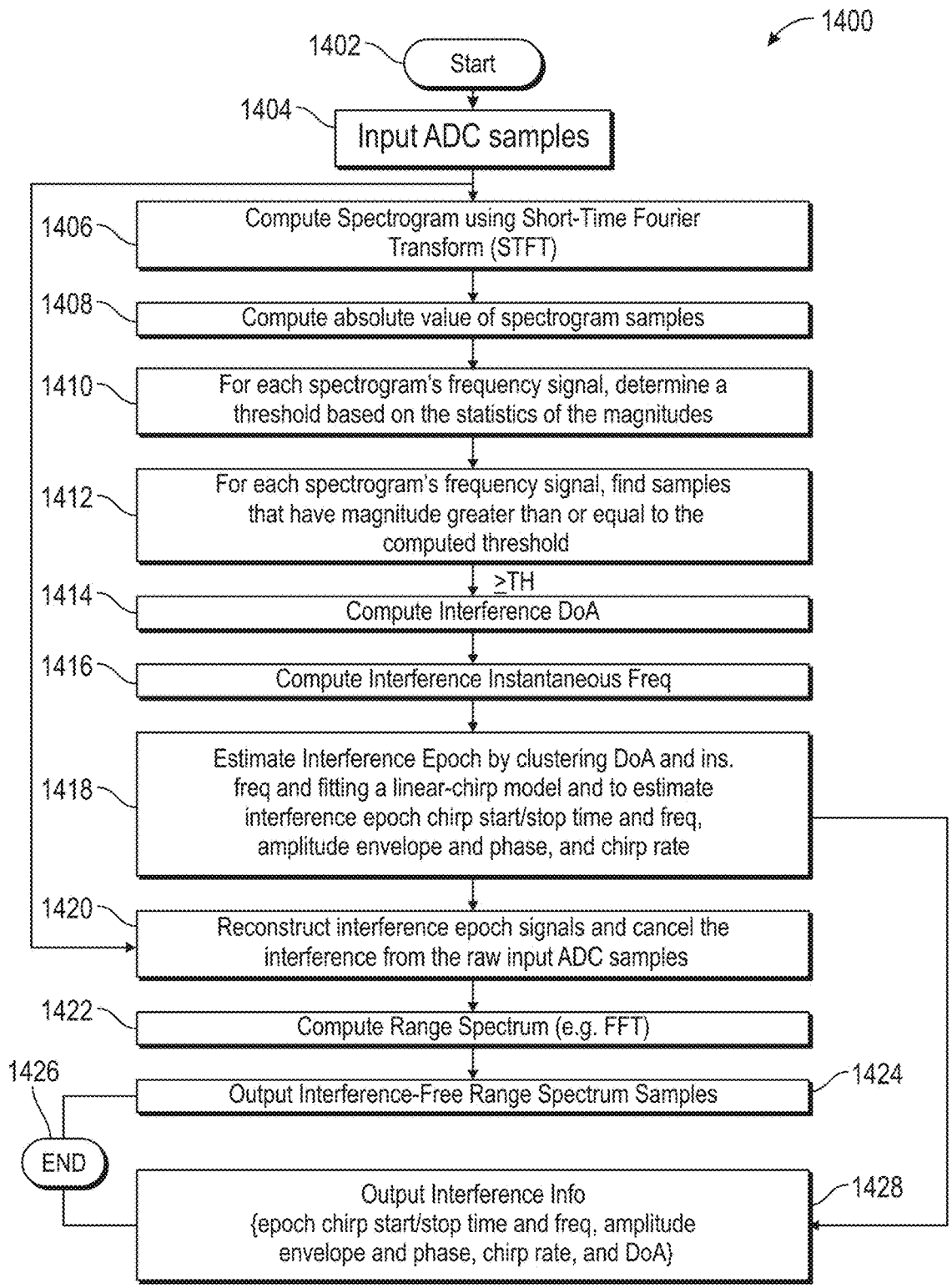
FIG. 14 illustrates a generalized flowchart for directly cancelling interference signal in ADC samples by reconstructing an interference signal ADC sample using the estimated chirp parameters of the interference chirp epochs.

FIG. 14 is a generalized flowchart for directly cancelling interference signal in ADC samples by reconstructing an interference signal ADC sample using the estimated chirp parameters of the interference chirp epochs. The order in which the method is described is not intended to be construed as a limitation, and any number of the described method steps may be combined in any order to implement the method, or alternate method.

At step 1402, the process 1400 starts. At step 1404, ADC samples are received and input into the system, such as described in FIGS. 1A and 1B. At step 1406, a spectrogram is computed using Short-Time Fourier Transform (STFT). At step 1408, the absolute value of the spectrogram samples are computed.

At step 1410, for each spectrogram's frequency signal, a determination is performed as to a threshold "TH" based on the statistics of the magnitudes of the frequency signals. At step 1412, for each spectrogram's frequency signal, samples are found that have a magnitude greater than or equal to the computed threshold "TH" determined at step 1410. At step 1414, for the samples having a magnitude greater than or equal to the computed threshold "TH," an interference direction of arrival "DoA" is computed.

At step 1416, the interference instantaneous frequencies are computed. At step 1418, estimation is performed as to interference epochs by clustering DoAs and interference instantaneous frequencies. A linear chirp model is fitted, and estimation is performed as to epoch chirp start/stop time and frequency, amplitude envelope and phase, and chirp rate.

At step 1420, interference epoch signals are reconstructed and interference from the raw input ADC samples are canceled. At step 1422, range spectrum is computed, such as by the use of a Fast Fourier Transform (FFT). At 1424, interference free range spectrum samples are output. At step 1426, the process 1400 ends.

In parallel to steps 1420, 1422, and 1424, following step 1418, at step 1428, interference information is output. The interference information can include epoch chirp start/stop time and frequency, amplitude envelope and phase, chirp rate, and DoA. At step 1426, the process 1400 ends. The cancellation is performed for individual isolated interference chirps and replaces the previously described zeroing step. For cells that are not identified with a reconstructed and fitted interference chirp for cancellation, zeroing may still be performed.

The reconstruction of individual interference chirp starts with the previously estimated interference epoch chirp parameters and is further refined by fitting each chirp to individually reconstructed interference chirp signal reconstructed from the isolated interference spectrograms. Using the DoA cluster, individual interferer's spectrogram samples can be first isolated, and then inverse STFT to the time domain. Chirp parameters can then be optimized by means of offset estimation (e.g., in starting frequency, chirp slope, magnitude, and phase), fitting, matching, or searching.

Figure 15:
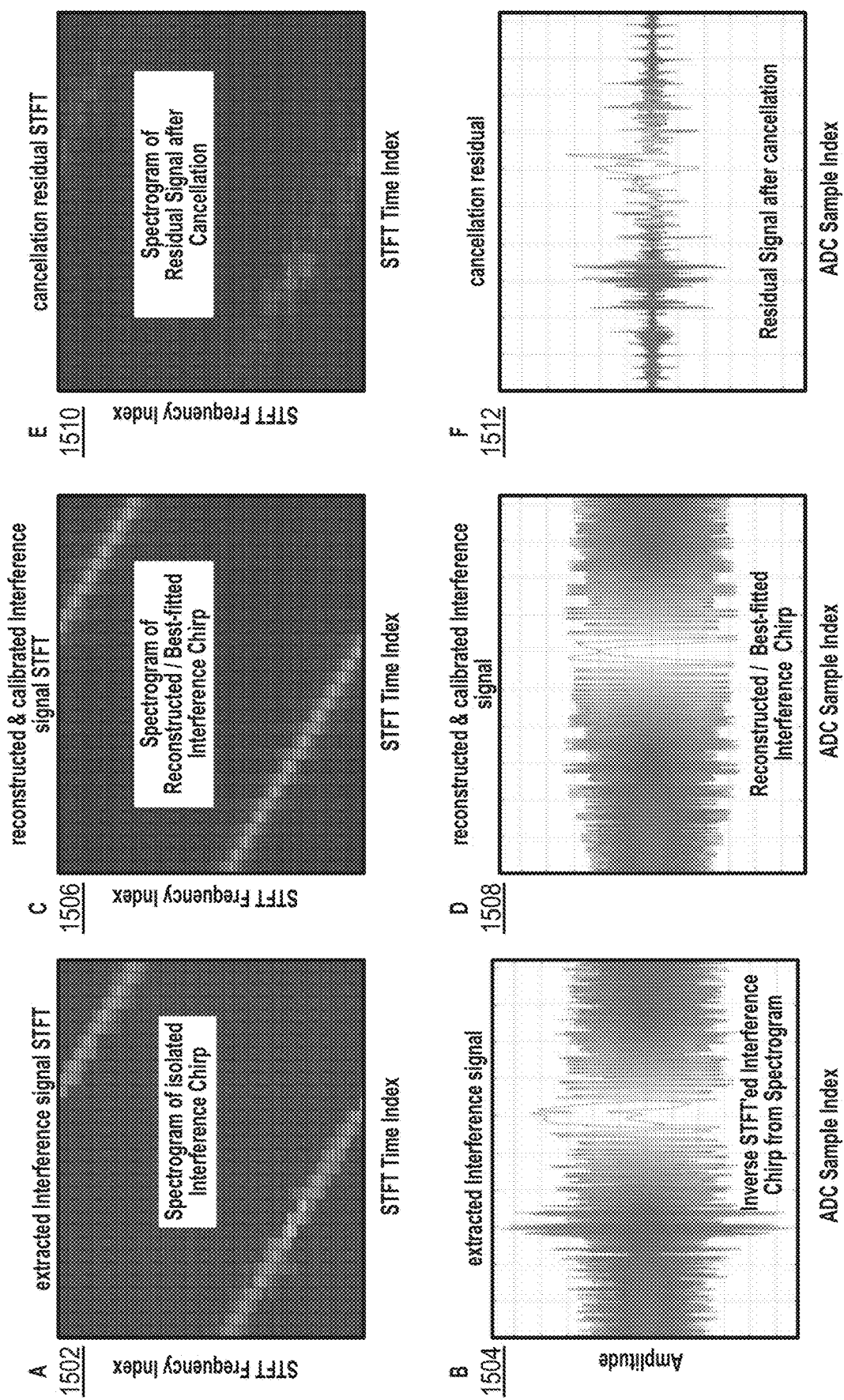
FIG. 15 illustrates spectrograms for interference chirp reconstruction and cancellation.

FIG. 15 shows spectrograms for interference chirp reconstruction and cancellation. Graph A 1502 shows an interference signal that is first isolated in the spectrogram domain. Graph B 1504 shows conversion back to time domain.

Chirp parameters, such as starting time and frequency, chirp slope, stopping time, magnitude, and phase are estimated based on a linear chirp model. The information about the chirp parameters is used for reconstructing interference chirp signals and for identifying the interferers. Cancellation is performed using the reconstructed interference chirp shown in graphs C 1506 and D 1508. Post-cancellation residual signal is shown in graphs E 1510 and F 1512.

Therefore, the interference signal can be suppressed by accurately estimating the chirp parameter and applying the proposed cancellation. It is to be noted that in this example, only one "arm" of the symmetric chirp is extracted for fitting and cancellation. It is expected, that since the signal is in real-data domain both arms can be extracted, such as by further association of the chirp epoch based on anti-symmetric DoAs and opposite-sign chirp slope and a start of two-pi ($2\pi$) frequency, and processed for real-value chirp fitting cancellation.

Figure 16:
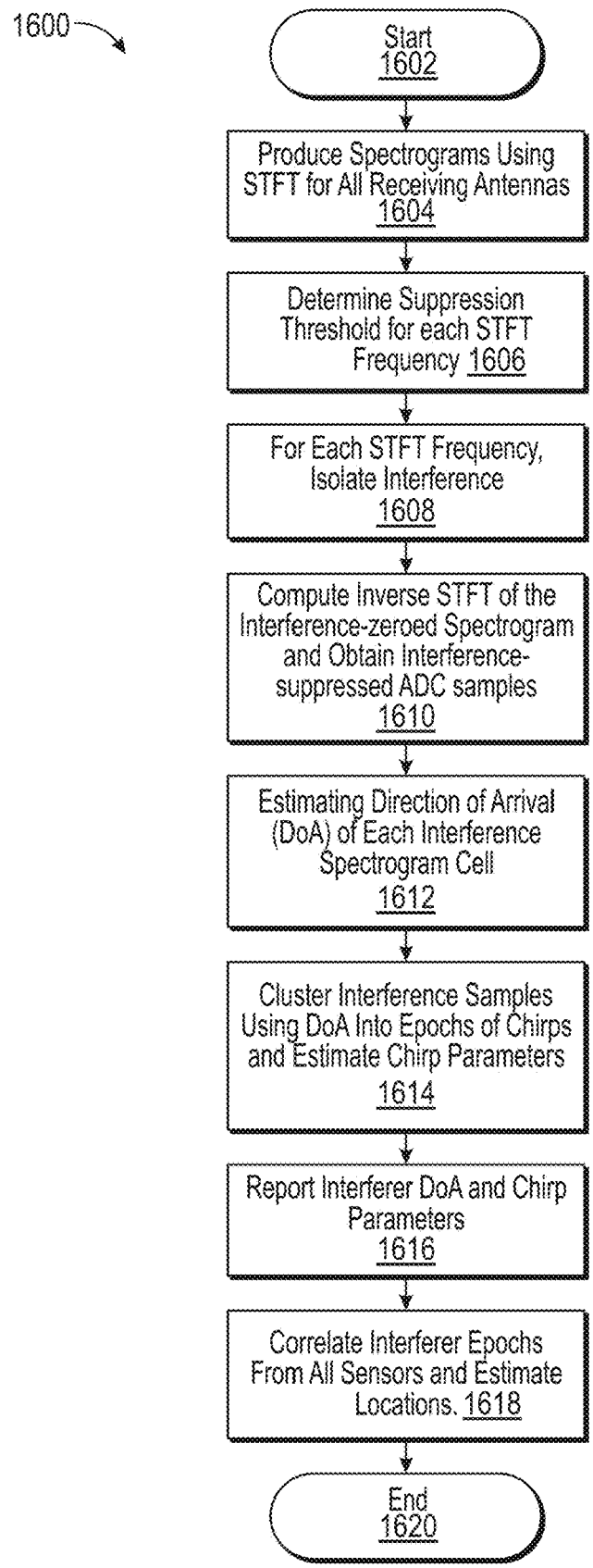
FIG. 16 illustrates a generalized flowchart for automotive radar systems that implement time frequency domain threshold interference and localization fusion to resolve interference issues.

FIG. 16 is a generalized flowchart for automotive radar systems that implement time frequency domain threshold interference and localization fusion to resolve interference issues. The order in which the method is described is not intended to be construed as a limitation, and any number of the described method steps may be combined in any order to implement the method, or alternate method.

At step 1602, the process 1600 starts. At step 1604, producing spectrograms using Short-Time Fourier Transform (STFT) for all receiving antennas is performed. At step 1606, for each STFT frequency, determining a suppression threshold is performed based on statistical analysis on samples from all the receiving antennas.

At step 1608, for each STFT frequency, isolating interference is performed by removing spectrogram samples that are above the suppression threshold by using a filter, and placing the removed spectrogram samples in different interference spectrograms. The filter can be based upon different principles. The filter can be a non-linear operation which zeroes samples exceeding a threshold, in this operation the edges of the zeroed regions can be optionally smoothed with a window function, alternatively it can be an interpolation filter that fills in the sample values at indices where the sample value exceeds the threshold. At step 1610, computing an inverse STFT of the interference-zeroed spectrogram is performed. Interference suppressed ADC samples are obtained for subsequent processes is performed.

At step 1612, estimating the Direction of Arrival (DoA) is performed for each interference spectrogram cell using measurements from all the receiving antennas. At step 1614, clustering interference samples using DoA into epochs (i.e., summarized data chunks) of chirps and estimating chirp parameters is performed.

At step 1616, reporting is performed of interferer DoA and chirp parameters to an interference localization fusion processor, such as interference localization fusion processor 174. At step 1618, correlating interferer epochs from all sensors and estimating their locations, is performed at the interference localization fusion processor, such as interference localization fusion processor 174. At step 1620, the process 1600 ends.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram step or steps.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for automotive radar systems that implement time frequency domain threshold interference suppression and/or estimation and localization fusion to resolve interference issues comprising:

producing spectrograms of ADC samples using Short-Time Fourier Transform (STFT) for all receiving antennas of the automotive radar system;

determining a suppression threshold for a frequency of each STFT;

isolating interference spectrograms for each STFT frequency by removing the interference from samples of the spectrograms that are above the suppression threshold by using a filter;

estimating the Direction of Arrival (DoA) for a cell of each interference spectrogram cell using measurements from all the receiving antennas; and clustering interference samples using the DoA into epochs of chirps.

2. The computer-implementable method of claim 1, wherein the determining for each STFT frequency a suppression threshold is based on statistical analysis of ADC samples from all the receiving antennas.

3. The computer-implementable method of claim 1, wherein the filter is based on a non-linear operation which zeroes the interference spectrogram samples that exceed the threshold or an interpolation filter that fills in samples at indices where a sample value exceeds the threshold.

4. The computer-implementable method of claim 1 further comprising estimating chirp parameters.

5. The computer-implementable method of claim 1 further comprising reporting interferer DoA and chirp parameters to a localization fusion processor.

6. The computer-implementable method of claim 1 further comprising correlating interferer epochs from all the receiving antennas and estimating interferer locations.

7. The computer-implementable method of claim 1 wherein after the interference samples are removed subsequent range, Doppler, and angle processing are carried out.

8. An automotive radar system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations for implementing time frequency domain threshold interference suppression and/or estimation and localization fusion to resolve interference issues and comprising instructions executable by the processor and configured for:

producing spectrograms of ADC samples using Short-Time Fourier Transform (STFT) for all receiving antennas of the automotive radar system;

determining a suppression threshold for a frequency of each STFT;

isolating interference spectrograms for each STFT frequency by removing the interference from samples of the spectrograms that are above the suppression threshold by using a filter;

estimating the Direction of Arrival (DoA) for a cell of each interference spectrogram cell using measurements from all the receiving antennas; and clustering interference samples using the DoA into epochs of chirps.

9. The automotive radar system of claim 8, wherein the determining for each STFT frequency a suppression threshold is based on statistical analysis of ADC samples from all the receiving antennas.

10. The automotive radar system of claim 8, wherein the filter is based on a non-linear operation which zeroes the interference spectrogram samples that exceed the threshold or an interpolation filter that fills in samples at indices where a sample value exceeds the threshold.

11. The automotive radar system of claim 8 further comprising estimating chirp parameters.

12. The automotive radar system of claim 8 further comprising reporting interferer DoA and chirp parameters to a localization fusion processor.

13. The automotive radar system of claim 8 further comprising correlating interferer epochs from all the receiving antennas and estimating interferer locations.

14. The automotive radar system of claim 8, wherein the interference samples are removed subsequent range, Doppler, and angle processing are carried out.

15. A non-transitory, computer-readable storage medium embodying computer program code, the computer program code comprising computer executable instructions configured for:

producing spectrograms of ADC samples using Short-Time Fourier Transform (STFT) for all receiving antennas of the automotive radar system;

determining a suppression threshold for a frequency of each STFT;

isolating interference spectrograms for each STFT frequency by removing the interference from samples of the spectrograms that are above the suppression threshold by using a filter;

estimating the Direction of Arrival (DoA) for a cell of each interference spectrogram cell using measurements from all the receiving antennas; and clustering interference samples using the DoA into epochs of chirps.

16. The non-transitory, computer-readable storage medium of claim 15, wherein the determining for each STFT frequency a suppression threshold is based on statistical analysis of ADC samples from all the receiving antennas.

17. The non-transitory, computer-readable storage medium of claim 15, wherein the filter is based on a non-linear operation which zeroes the interference spectrogram samples that exceed the threshold or an interpolation filter that fills in samples at indices where a sample value exceeds the threshold.

18. The non-transitory, computer-readable storage medium of claim 15 further comprising estimating chirp parameters.

19. The non-transitory, computer-readable storage medium of claim 15 further comprising reporting interferer DoA and chirp parameters to a localization fusion processor.

20. The non-transitory, computer-readable storage medium of claim 15 further comprising correlating interferer epochs from all the receiving antennas and estimating interferer locations.

* * * * *